(12) United States Patent
Jeswine

(10) Patent No.: US 8,808,510 B2
(45) Date of Patent: Aug. 19, 2014

(54) SYSTEM AND METHOD FOR A CONSTITUENT RENDERING OF BIOMASS AND OTHER CARBON-BASED MATERIALS

(75) Inventor: William Jeswine, Seattle, WA (US)

(73) Assignee: Prime Group Alliance, Seattle, WA (US)

( * ) Notice: Subject to any disclaimer, the term of this patent is extended or adjusted under 35 U.S.C. 154(b) by 877 days.

(21) Appl. No.: 12/771,685

(22) Filed: Apr. 30, 2010

(65) Prior Publication Data

US 2010/0276270 A1    Nov. 4, 2010

Related U.S. Application Data

(60) Provisional application No. 61/174,198, filed on Apr. 30, 2009.

(51) Int. Cl.
*C10B 49/14* (2006.01)
*C10J 3/57* (2006.01)

(52) U.S. Cl.
USPC ............... 202/219; 48/86 R; 48/92; 202/262

(58) Field of Classification Search
USPC ........ 202/219, 262, 117, 118; 201/11, 6, 7, 8, 201/41; 48/92, 86 R, DIG. 3; 208/404; 196/118; 241/82.1, 247
See application file for complete search history.

(56) References Cited

U.S. PATENT DOCUMENTS

| | | | | |
|---|---|---|---|---|
| 1,373,699 A | * | 4/1921 | Ard | 202/219 |
| 1,658,143 A | | 2/1928 | Tripp | |
| 2,700,018 A | * | 1/1955 | Gilbert | 201/11 |
| 3,770,419 A | | 11/1973 | Brown | |
| 3,977,960 A | * | 8/1976 | Stout | 202/219 |
| 4,345,990 A | * | 8/1982 | Fahlstrom et al. | 48/92 |
| 4,743,341 A | * | 5/1988 | Hladun | 202/219 |
| 4,842,694 A | | 6/1989 | Bennett | |
| 5,466,108 A | * | 11/1995 | Piroska | 414/218 |
| 5,693,188 A | | 12/1997 | Donnohue et al. | |

FOREIGN PATENT DOCUMENTS

DE    10212104    9/2003

OTHER PUBLICATIONS

International Search Report and Written Opinion for International Application No. PCT/US2010/033199 (mailed Sep. 30, 2010).

* cited by examiner

*Primary Examiner* — Jill Warden
*Assistant Examiner* — Joye L Woodard
(74) *Attorney, Agent, or Firm* — Smith, Gambrell & Russell

(57) ABSTRACT

A system and method for a constituent rendering of biomass and other carbon-based materials is provided. The system can be configured for receiving a feedstock material to be rendered into its constituent components, grinding the feedstock to a desired size and/or consistency, and placing the feedstock in contact with a hot mix heat transfer medium within a pressure chamber. In an aspect, the system can utilize a feedstock input system to receive the feedstock material, with the feedstock input system including an auger feed tube, at least one feed stock auger screw, a grinding station with a die configured to interact with the feed stock auger screw, and a movable compression gate. Pyrolysis of the feedstock can lead to a breakdown of the feedstock into constituent components that can then be collected.

7 Claims, 22 Drawing Sheets

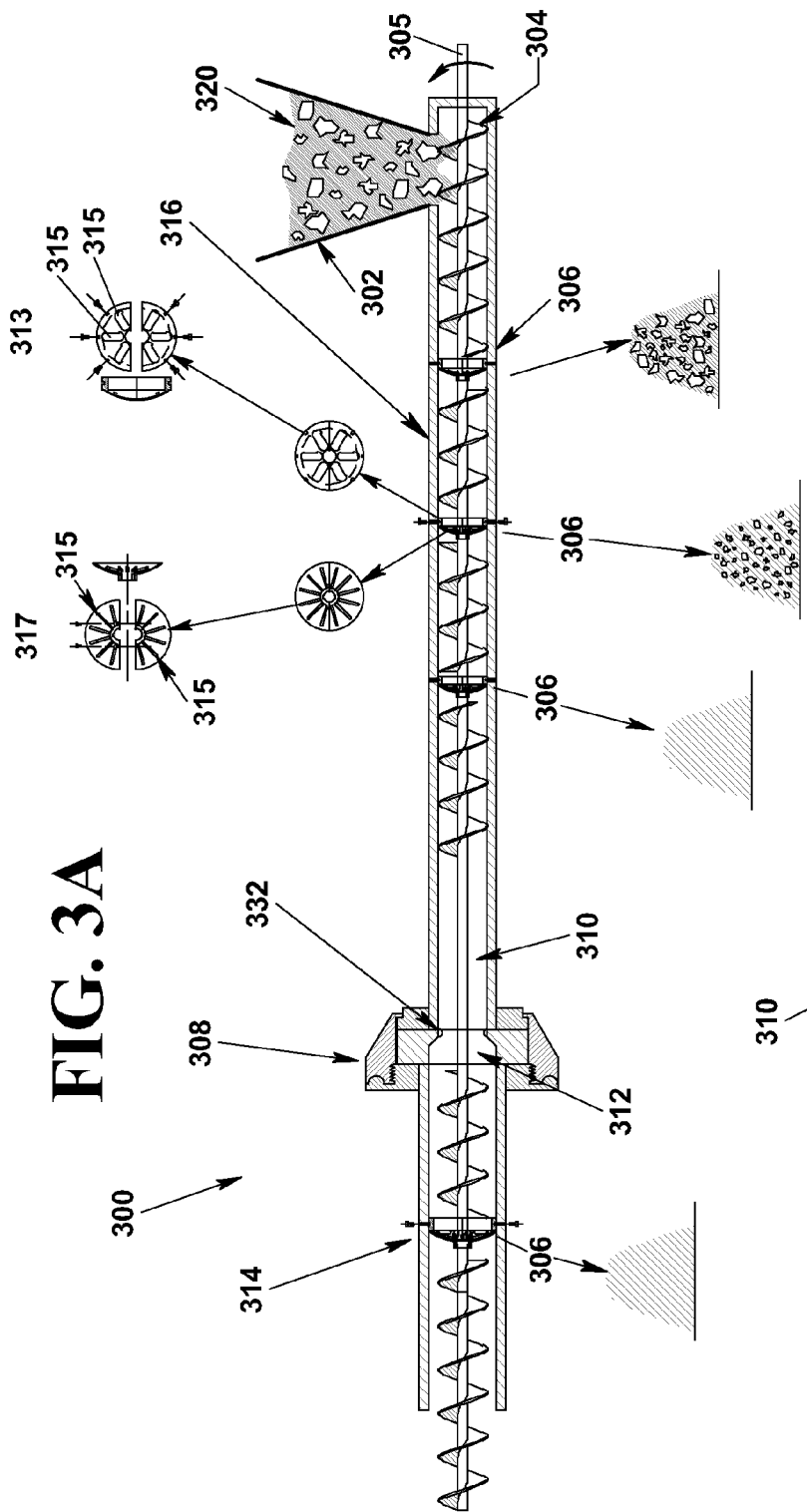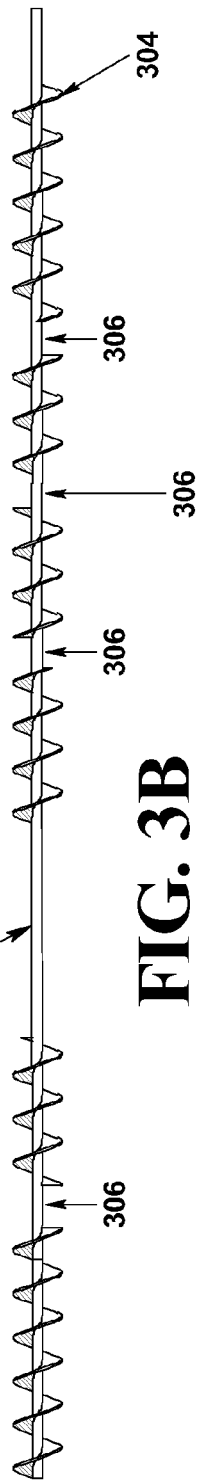

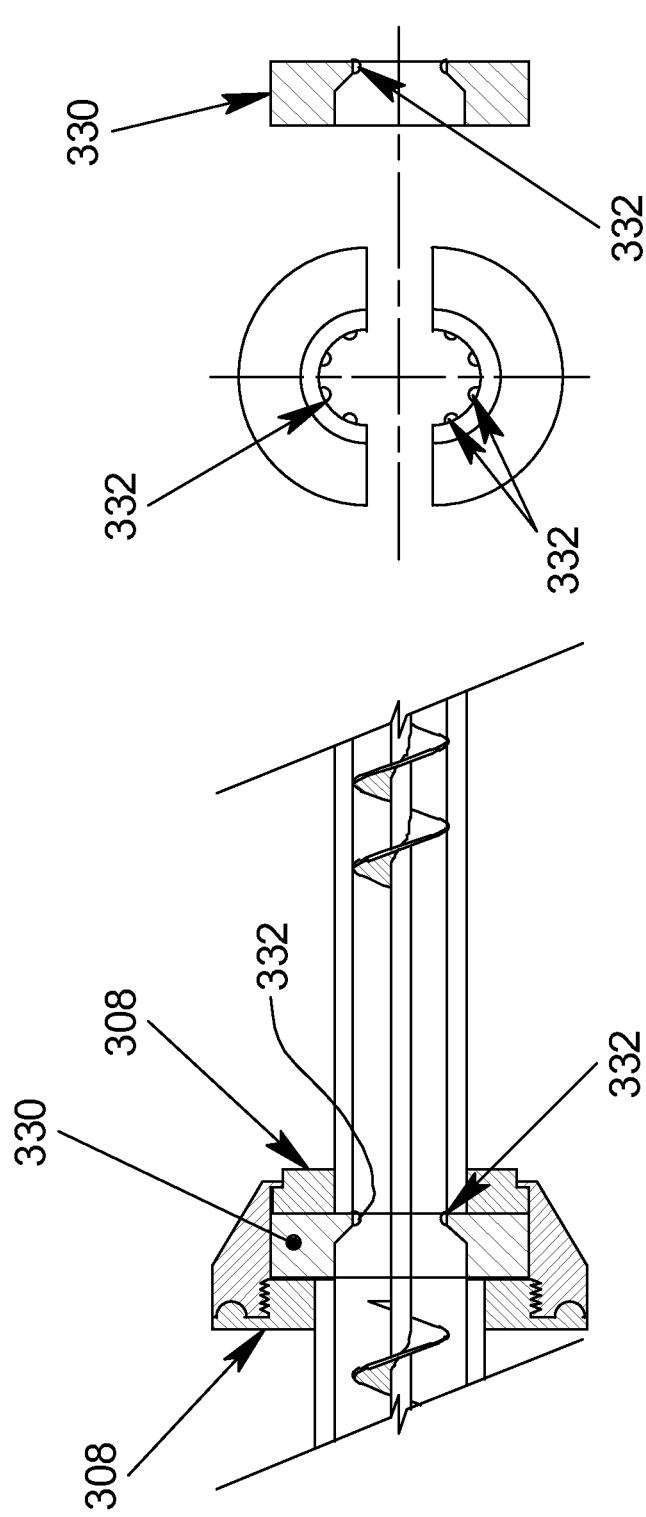

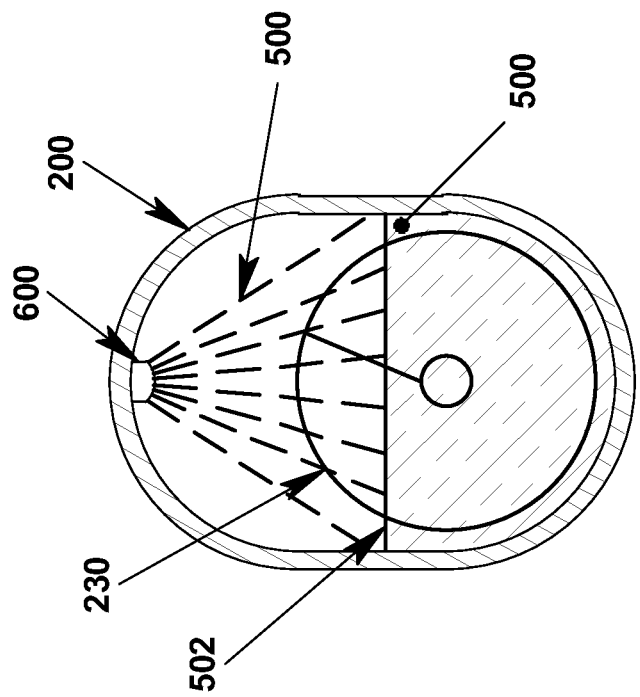
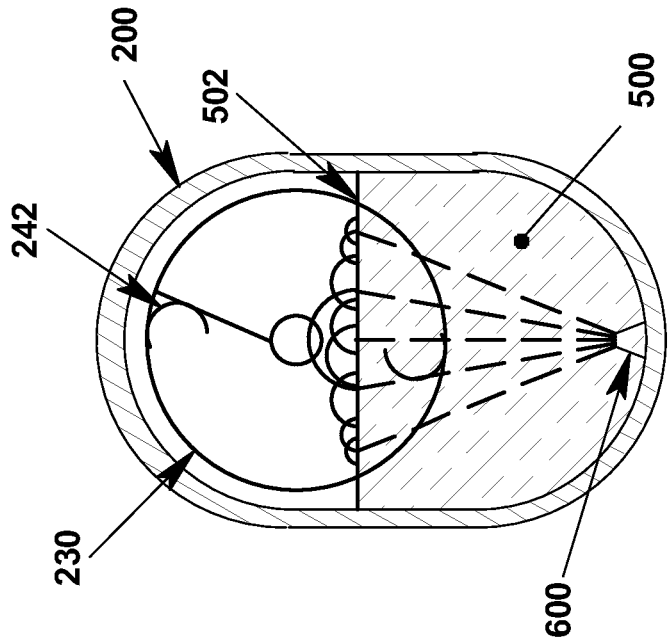
Fig. 20B
Fig. 20A

SYSTEM AND METHOD FOR A CONSTITUENT RENDERING OF BIOMASS AND OTHER CARBON-BASED MATERIALS

CROSS-REFERENCE TO RELATED APPLICATIONS

This application claims priority to U.S. Provisional Application No. 61/174,198, filed Apr. 30, 2009, which is incorporated herein by reference.

BACKGROUND OF THE INVENTION

1. Field of the Invention

This invention relates generally to a system and method for constituent rendering of biomass and other carbon-based materials. More specifically, this invention relates to a system and method for thermo-enhanced constituent rendering of biomass and other carbon-based materials through the use of a molten heavy metal, such as, for example and without limitation, lead.

2. Background of the Invention

Biomass is generally considered to be organic matter that can be converted to fuel. Examples of biomass can be hydrocarbon-based materials as varied as orange peels, coffee grounds, grass clippings, newspaper, polypropylene rope, plastics, tires, coal, yard waste, fiberglass, blackberries vines, wood, logging waste, garbage, and sewage sludge.

As commonly known in the arts, heating biomass in the absence of oxygen (a process called pyrolysis) can reduce the biomass to its constituent components. In one example, pyrolysis of a tire can break the tire down into its constituent components comprising steel, carbon black and oil. In another example, pyrolysis of wood can break the wood down into its constituent components comprising light oil, a gas with properties similar to petroleum gas, and ash. Conventional systems and methods proposed to heat biomass for pyrolysis requires the biomass to be processed in batches, thereby reducing the efficiency of the systems. Thus, there is a need in the art for an efficient system and method for constituent rendering of biomass and other carbon-based materials.

SUMMARY OF THE INVENTION

In accordance with the purposes of this invention, as embodied and broadly described herein, this invention, in one aspect, relates to a system for a constituent rendering of biomass and other carbon-based materials. In a further aspect, the system can be configured for receiving a feedstock material to be rendered into its constituent components, grinding the feedstock to a desired size and/or consistency, and placing the feedstock in contact with a hot mix heat transfer medium within a pressure chamber. In still a further aspect, pyrolysis of the feedstock can lead to a breakdown of the feedstock into at least one constituent component that can be collected as gases, draining off as liquids, filtered, removed with a magnet, and/or skimmed off of the hot mix transfer medium.

In one aspect, the pressure chamber can be a pressurized, enclosed container configured for maintaining a quantity or pool of the hot mix transfer medium at a predetermined temperature and pressure. In another aspect, the pressure chamber can define a feedstock input port for receiving feedstock from a feedstock input system and at least one gas output port configured to collect feedstock constituent components that are gases. In another aspect, the pressure chamber can have an ash trap for collecting ash and/or feedstock constituent components that are solids. Optionally, in one aspect, the pressure chamber can comprise at least one spray head, configured for spraying the hot mix transfer medium within the pressure chamber. In still other aspects, the pressure chamber can comprise at least one hot mix pump configured to circulate the hot mix transfer medium through at least a portion of the pressure chamber and/or through at least one spray head, if present.

According to another aspect, the feedstock input system can comprise at least one grinding station configured for grinding the feedstock. The at least one grinding station can comprise a plurality of grinding stations, in one aspect, that can be sequentially arranged so that feedstock can pass from one grinding station to the next until a desired feedstock size and/or consistency is achieved. Optionally, the feedstock input system can further comprise a compression gate to allow the feedstock to be supplied to the pressure chamber without allowing unacceptable levels of oxygen to enter the pressure chamber.

In one aspect, the hot mix transfer medium can comprise a molten heavy metal having a relatively high specific gravity, such as, for example and without limitation, lead. Lead has a specific gravity of about 11.8, so any constituent components of the feedstock having a specific gravity of less than 11.8 can float in a hot mix comprising molten lead. Thus, in this example, only feedstock constituent components having a specific gravity of greater than about 11.8 will sink, such as any heavy precious metals.

The feedstock for the system can be any biomass and/or other carbon-based materials. In one aspect, the feedstock can comprise wood or logging waste, such as wood chips and the like. In various other aspects, it is contemplated that the feedstock can comprise oil sands, oil shale, dirty coal and/or other similar contaminated sources of hydrocarbons.

Additional advantages of the invention will be set forth in part in the description which follows, and in part will be obvious from the description, or may be learned by practice of the invention. The advantages of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate several aspects of the invention and, together with the description, serve to explain the principles of the invention.

FIG. 3A is a cross-sectional side view of a feedstock input system of the system of FIG. 1, according to one aspect.

FIG. 3B is a cross-sectional side view of an auger screw of the feedstock input system of the system of FIG. 3A, according to one aspect.

FIG. 7 is a cross-sectional side view of a compression gate of the feedstock input system of FIG. 3, showing the compression gate in a closed position, according to one aspect.

FIG. 8A is a front view of a throat of the compression gate of FIG. 7, according to one aspect.

FIG. 8B is a cross-sectional side view of a throat of the compression gate of FIG. 7, according to one aspect.

FIG. 20A is a cross-sectional end view of portions of the system of FIG. 13, according to one aspect.

FIG. 20B is a cross-sectional end view of portions of the system of FIG. 12, according to one aspect.

DESCRIPTION OF THE PREFERRED EMBODIMENTS

Figure 1:
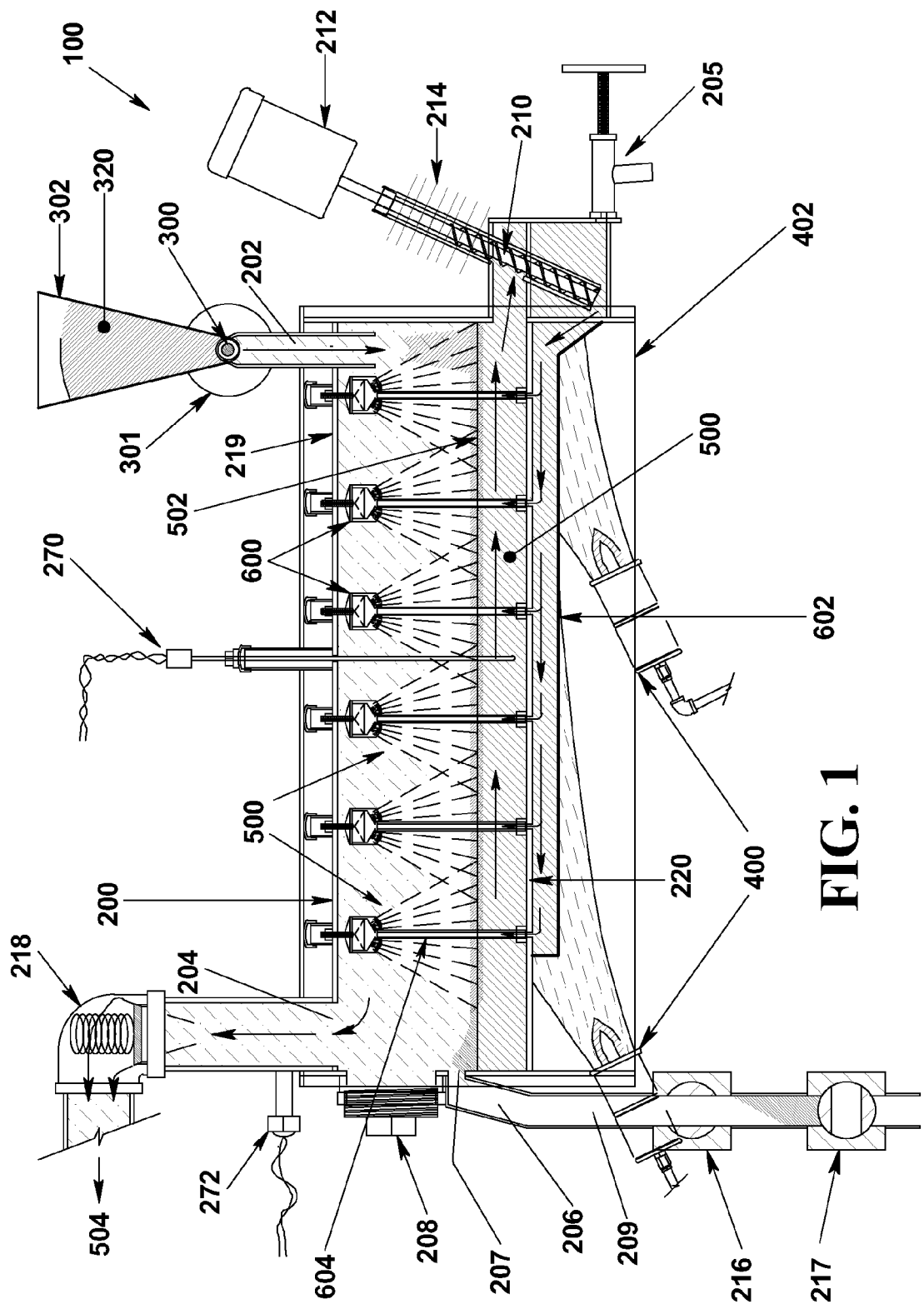
FIG. 1 is a cross-sectional side view of a system for constituent rendering of biomass and other carbon-based materials, according to one embodiment.

The present invention may be understood more readily by reference to the following detailed description, drawings, and claims, and their previous and following description. However, before the present devices, systems, and/or methods are disclosed and described, it is to be understood that this invention is not limited to the specific devices, systems, and/or methods disclosed unless otherwise specified, as such can, of course, vary. It is also to be understood that the terminology used herein is for the purpose of describing particular aspects only and is not intended to be limiting.

As used in the specification and the appended claims, the singular forms "a," "an" and "the" include plural referents unless the context clearly dictates otherwise. Thus, for example, reference to a "spray head" can include two or more such spray heads unless the context indicates otherwise.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

As used herein, the terms "optional" or "optionally" mean that the subsequently described event or circumstance can or cannot occur, and that the description includes instances where said event or circumstance occurs and instances where it does not.

Reference will now be made in detail to the present preferred aspects of the invention, examples of which are illustrated in the accompanying drawings. Wherever possible, the same reference numbers are used throughout the drawings to refer to the same or like parts.

In one aspect, a system 100 is provided for a constituent rendering of biomass and other carbon-based materials. The system, in one embodiment, can comprise at least one of: a pressure chamber 200, a feedstock input system 300, at least one heat source 400, and a hot mix heat transfer medium ("hot mix") 500. In various aspects, the system can further comprise at least one spray head 600 and/or a process auger 230.

With reference to FIG. 1, in one aspect, the pressure chamber 200 can be a pressurized, enclosed container configured for maintaining a quantity or pool of hot mix at a predetermined temperature and pressure. In another aspect, the pressure chamber can define an enclosed interior volume. In this aspect, the enclosed interior volume can be sufficient to function as a plenum to absorb rapidly generated gases 322 when feedstock 320 is introduced to the pool of hot mix 500, described more fully below. In another aspect, the pressure chamber can comprise at least one of: an ash trap 206, a maintenance port 208, and at least one hot mix pump 210. In yet another aspect, the pressure chamber can define a feedstock input port 202, at least one gas output port 204, and/or a drain port in communication with a hot mix drain valve 205 configured to allow selective draining of hot mix 500 from the pressure chamber 200. In yet another aspect, the pressure chamber can also define various other ports configured for draining off liquids and skimming off or otherwise removing any solids, as desired, from the pressure chamber.

In another aspect, the pressure chamber can further comprise at least one temperature sensor 270 and/or at least one pressure sensor 272. In this aspect, the at least one pressure sensor can send a feedback signal representing the pressure within the pressure chamber 200 to a means for controlling the pressure, such as a processor, an actuator and a valve and the like. Similarly, the at least one temperature sensor 270 can send a feedback signal representing the temperature within the pressure chamber 200 to a means for controlling the temperature, such as a processor and a heat source and the like.

In one aspect, the feedstock input port 202 and the at least one gas output port 204 can be openings defined in a surface of the pressure chamber. In another aspect, the feedstock input port and the at least one gas output port can be positioned in the pressure chamber 200 at a location above an upper surface level 502 of the pool of hot mix 500 in the pressure chamber. In still another aspect, the feedstock input port 202 can place the pressure chamber 200 in communication with the feedstock input system 300, described more fully below. In another aspect, the at least one gas output port 204 can be configured to release a gas or gases 504 created when the feedstock 320 is broken down into at least one constituent component in the pressure chamber for distilling and/or other use.

As illustrated in FIG. 1, in one aspect, the at least one hot mix pump 210 can be a conventional Archimedes screw-type pump, though other types of pumps are also contemplated. In another aspect, at least a portion of the at least one hot mix pump can be placed into the pool of hot mix 500 in order to circulate the hot mix within at least a portion of the pressure chamber 200. Optionally, in other aspects, the at least one hot mix pump 210 can pump hot mix through a hot mix distribution system 602 to at least one spray head 600. In still another aspect, the at least one hot mix pump can comprise a conventional pump motor 212 and a plurality of cooling fins 214, as known in the art.

When feedstock 320 is input into the pressure chamber 200 and decomposed through pyrolysis, as will be described more fully below, a small amount of the feedstock can remain as ash. In one aspect, as the at least one hot mix pump 210 circulates hot mix 500 within the pressure chamber, a current can be created that can transport the ash to an end of the pressure chamber where the ash trap 206 can be located. In another aspect, the ash trap can comprise a receptacle 209 and a plurality of ash valves 216, 217. In yet another aspect, the ash trap can be placed in communication with the interior volume of the pressure chamber by a skimmer opening 207 defined in the wall of the pressure chamber 200. In another aspect, each ash valve of the plurality of ash valves can normally be maintained in a closed position thereby preventing, ash, pressure, and/or any other materials from exiting the pressure chamber 200. In still another aspect, the skimmer opening 207 defined in the wall of the pressure chamber can be positioned at a level slightly above the upper surface level 502 of the pool of hot mix 500 in the pressure chamber 200.

In use, over time, enough ash can collect so that the ash spills over through the skimmer opening 207 into the ash trap and can be stored in the receptacle 209. In another aspect, as ash is collected in the receptacle, the receptacle can be emptied by selectively actuating one or more of the plurality of ash valves 216, 217. It is contemplated that the plurality of ash valves can be opened sequentially or non-sequentially as desired. In one exemplary aspect, a first ash valve 216 of the plurality of ash valves can be cycled open, thereby allowing the ash and/or other materials to drop into a space between the plurality of ash valves before the first ash valve is closed. In this exemplary aspect, a second ash valve 217 of the plurality of ash valves can then be cycled open, thereby allowing the ash and/or other materials to be removed from the system 100 before the second ash valve is closed. In still another aspect, because the pressure chamber 200 can be operated at an elevated pressure, as will be described more fully below, the elevated pressure can tend to keep air from entering the last ash valve of the plurality of ash valves before it closes.

Figure 2:
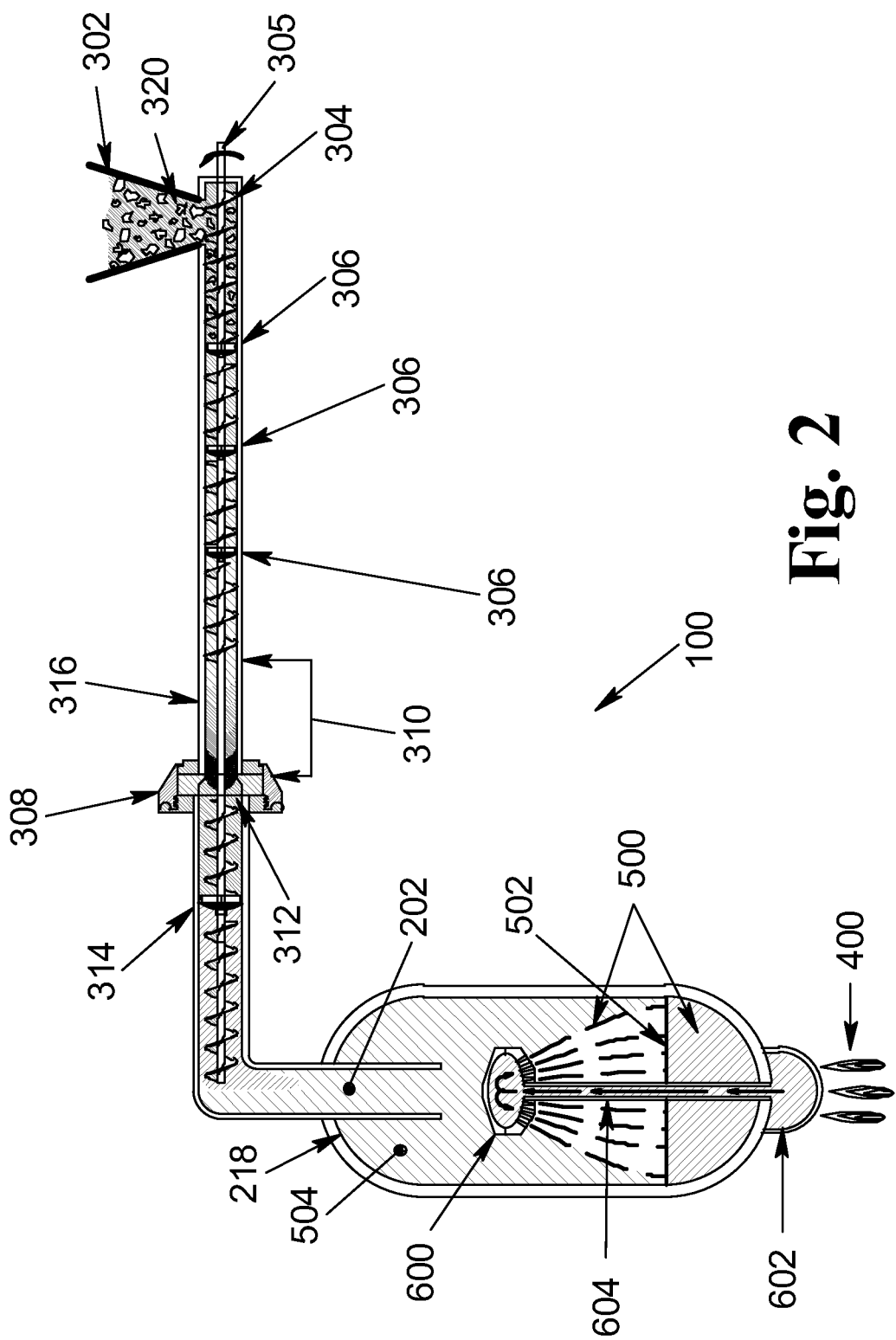
FIG. 2 is a cross-sectional end view of the system of FIG. 1.

The feedstock input system 300 can be seen in FIG. 2, according to one aspect. In this aspect, the feedstock input system 300 comprises at least one of: a feed auger motor 301, a feedstock hopper 302, a feedstock auger screw 304, at least one grinding station 306, a compression gate 308, and a re-grinding station 314. The feedstock hopper 302, in one aspect, can feed coarse raw feedstock 320 to the feedstock auger screw 304. In another aspect, the feed auger motor 301 can be a conventional motor configured to turn the feedstock auger screw 304. In an aspect, the feedstock auger screw 304 can be found in a auger feed tube 316, with the auger feed tube 316 in communication with the feedstock input port 202, as shown in FIG. 2. In another aspect, as the feedstock auger screw 304 is rotated by the feed auger motor 301, the feedstock material 320 is moved along the auger feed tube 316 to the at least one grinding station 306 configured to grind the feedstock 320 into smaller pieces. In another aspect, smaller pieces of feedstock 320 can be desired, because the smaller pieces have a larger surface area and thus can facilitate more rapid thermal gasification when in contact with the hot mix 500. In still another aspect, and as illustrated in FIG. 2, the at least one grinding station 306 can comprise a plurality of grinding stations 306 that can be sequentially arranged along the auger feed tube 316 such that feedstock 320 can be passed on to consecutive grinding stations 306 until a desired size and/or consistency of feedstock 320 is achieved.

FIG. 3A illustrates the feedstock input system 300 in greater detail, and FIG. 3B illustrates the feedstock auger screw 304 of the feedstock input system 300 in greater detail, according to various aspects. In another aspect, the at least one grinding station 306 comprises a stationary die 313 defining a plurality of die openings 315 that can be attached to the auger feed tube 316. In another aspect, the at least one grinding station 306 further comprises a rotating die 317 attached to a shaft 305 of the feedstock auger screw 304 adjacent to and on a downstream side of the stationary die 313. As with the stationary die 313, the rotating die 317 can define a plurality of die openings 315. In this aspect, as the feedstock auger screw 306 of the feedstock input system 300 rotates, feedstock 320 can be urged against the stationary die 313 within the auger feed tube 316 and some of the feedstock 320 can be urged through the die openings 315 of the stationary die 313. In another aspect, at least a portion of the feedstock 320 that was urged through the die openings 315 of the stationary die 313 can also be urged through the die openings 315 of the rotating die 317, shearing off the feedstock 320, and producing a ground feedstock 320.

As illustrated in FIGS. 2 and 3A, at the downstream side of the at least one grinding station 306, according to one aspect, there can be a compression zone 310 bounded by the auger feed tube 316 and the compression gate 308. In another aspect, the compression zone 310 can be a relatively long segment of the auger feed tube 316 devoid of an auger blade on the feedstock auger screw 304. In this aspect, when the compression gate 308 is closed, as described below, and the feedstock auger screw 304 urges feedstock 320 into the compression zone 310, the compression zone 310 can become solidly packed with high density feedstock 320. In still another aspect, the feedstock auger screw 304 can rotate until the desired density of feedstock 320 in the compression zone 310 is reached, forming a plug of feedstock 320 in the compression zone 310. In another aspect, the plug of feedstock 320 can be substantially impervious to gas and can form a barrier to the outside atmospheric gas. Thus, the feedstock plug will not allow passage of atmospheric gas into the pressure chamber 200, thereby helping to maintain the oxygen level in the pressure chamber 200 at an acceptable level. Conversely, the feedstock plug also will not allow passage of gases 322 from the pressure chamber 200 out of the pressure chamber 200 to the atmosphere, thereby helping to maintain pressure in the pressure chamber 200 at an acceptable level. In another aspect, after formation of the feedstock plug, the compression gate 308 can then be opened, described more fully below, which allows the compressed feedstock 320 to pass through the compression gate 308 to an expansion zone 312.

Optionally, in another aspect, after formation of the feedstock plug, a throat 330 having at least one compression and fracture stress point 332 can be inserted into the compression gate 308, as illustrated in FIG. 7. The at least one compression and fracture stress point 332, according to one aspect, can be a small restriction that can further compress and at the same time induce fracture in the feedstock plug as it passes through the compression gate 308 to the expansion zone 312.

Figure 4:
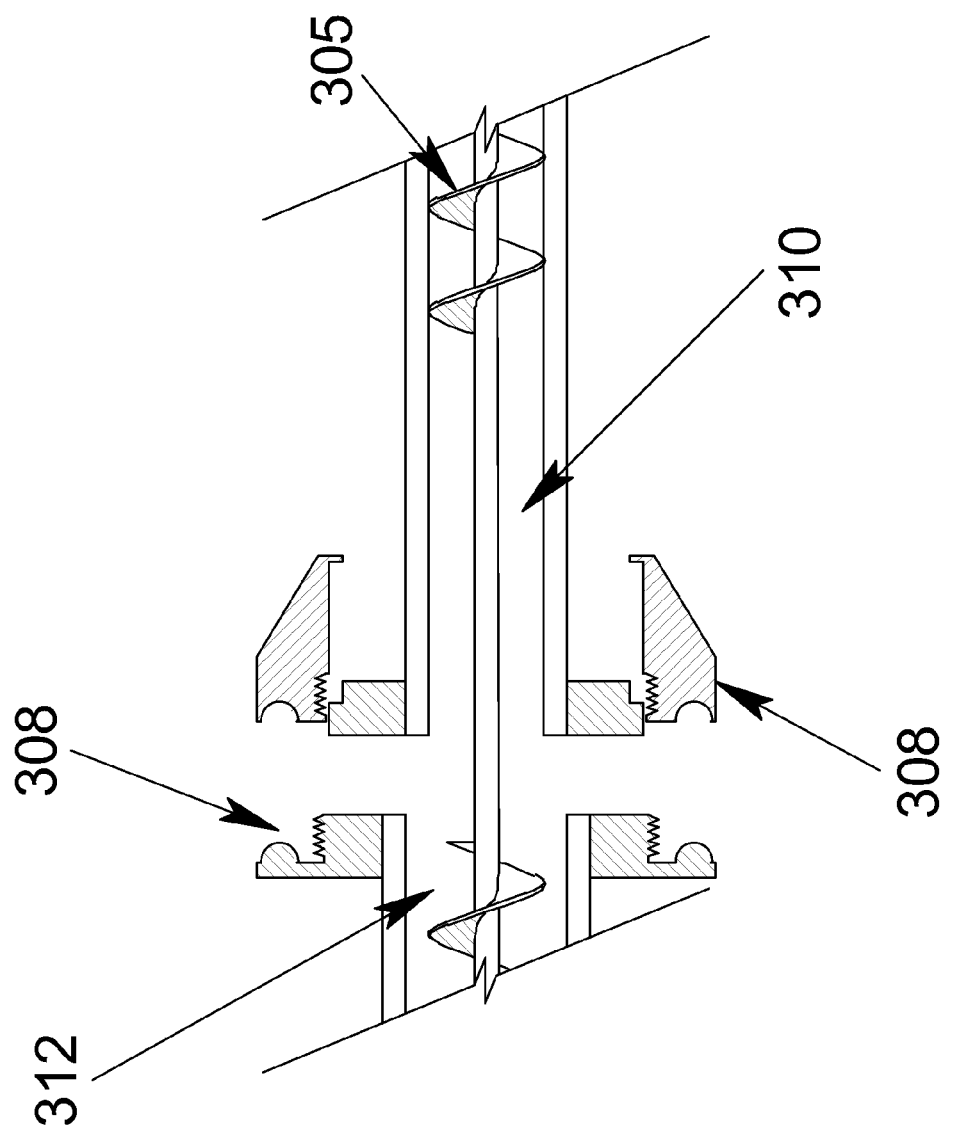
FIG. 4 is a cross-sectional side view of a compression gate of the feedstock input system of FIG. 3, showing the compression gate in an open position, according to one aspect.
Figure 6:
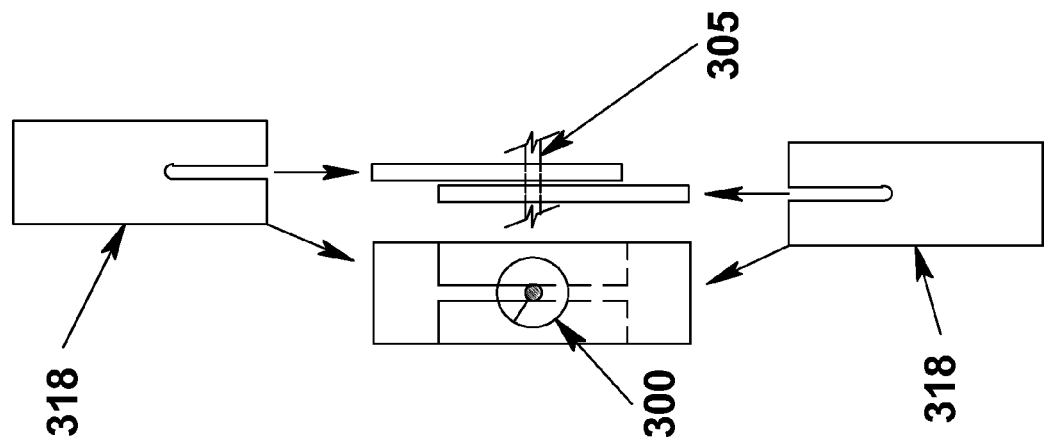
FIG. 6 is an exploded and an assembled view of the blocking plates of the compression gate of FIG. 5, according to one aspect.
Figure 5:
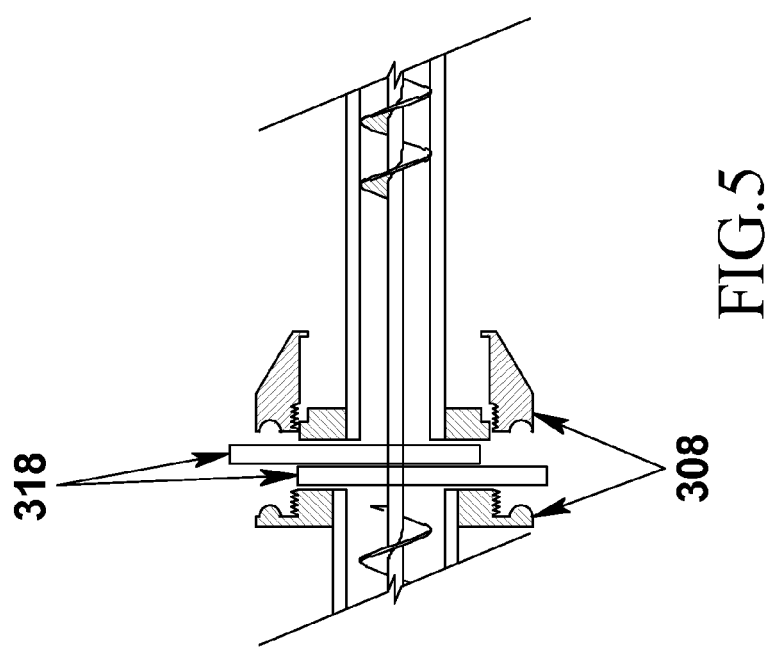
FIG. 5 is a cross-sectional side view of a compression gate of the feedstock input system of FIG. 3, showing the compression gate in a blocked position, according to one aspect.

FIGS. 4, 5, and 7 illustrate the compression gate 308 in various states of operation. As illustrated in FIG. 4, in one aspect, the compression gate 308 can be opened allowing feedstock particles to pass through the compression gate 308 uninhibited. Alternatively, however, in another aspect, a plurality of slotted blocking plates 318 can be inserted into the compression gate 308 and around the shaft 305 of the feedstock auger screw 304, as illustrated in FIGS. 5 and 6, to prevent or reduce the amount of feedstock 320 being urged through the compression gate 308. In still another aspect, as exemplified in FIGS. 7 and 8, the throat 330 can have a reduced cross-sectional area compared to the compression zone 310 and can be inserted into the compression gate 308 to compress and to induce fracture in the feedstock plug as it passes through the compression gate 308. It is contemplated that the compression gate 308 can be changed to its various states of operation either manually or automatically.

With reference again to FIGS. 2 and 3, in one aspect, the expansion zone 312 can have a larger cross-sectional diameter than the compression zone 310, thus allowing the compressed feedstock to expand when urged through the compression gate 308 into the expansion zone. In another aspect, the feedstock auger screw 304 can urge the feedstock 320 through the expansion zone to a re-grinding station 314 configured to reduce the feedstock particle size before being dropped into the pressure chamber 200. In still another aspect, the re-grinding station 314 can be substantially the same as the at least one grinding station 306, described previously. In another aspect, the re-ground feedstock can then be gravity fed, conveyed, and/or urged to the feedstock input port 202 of the pressure chamber.

Figure 11:
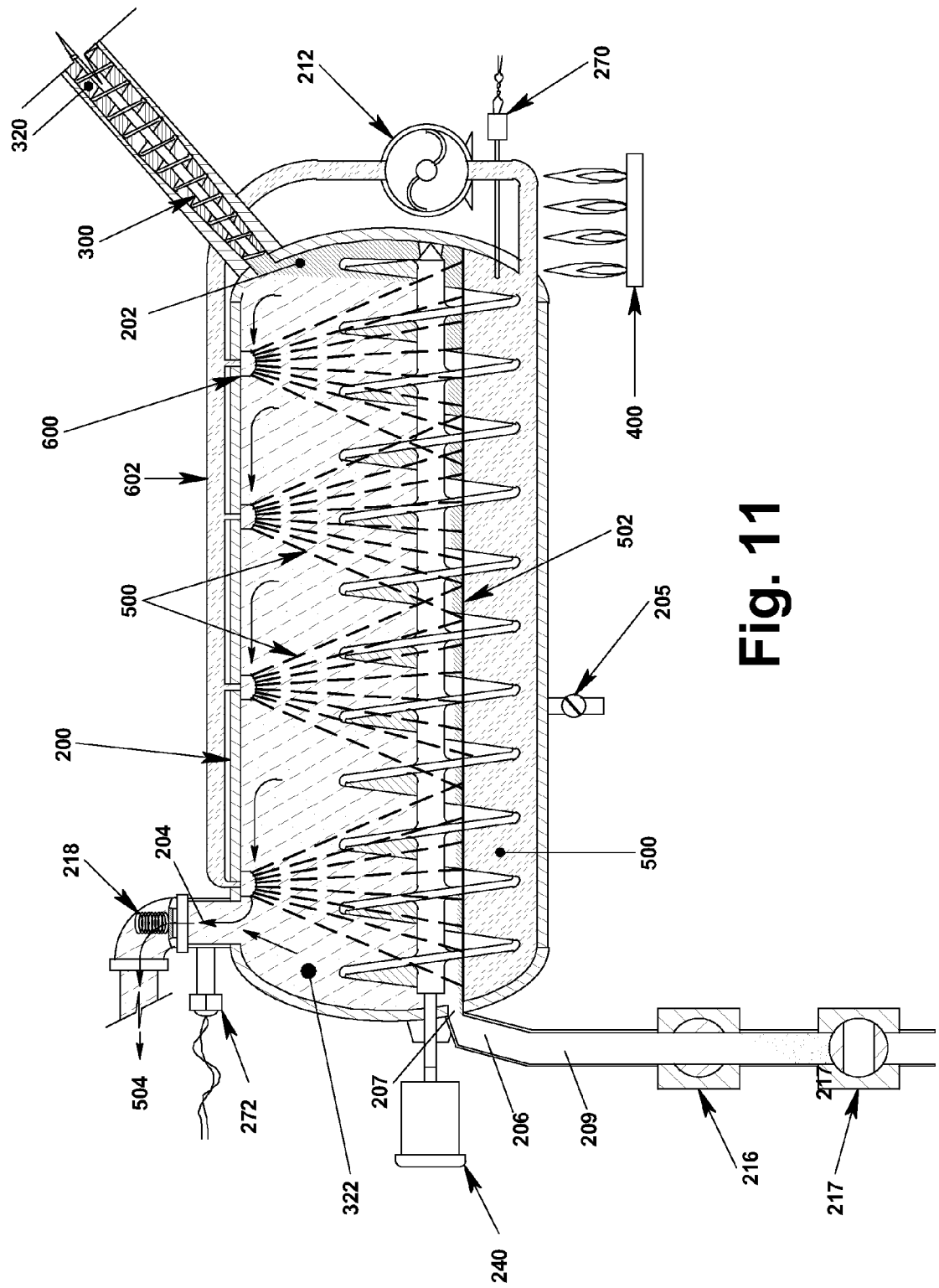
FIG. 11 is a cross-sectional side view of a system for constituent rendering of biomass and other carbon-based materials, according to one aspect.

As illustrated in FIG. 1, in one aspect, the at least one heat source 400 can be configured for heating at least a portion of the pressure chamber 200. Optionally, in another aspect, the at least one heat source 400 can be configured for heating at least a portion of the hot mix distribution system, as illustrated in FIG. 11. In another aspect, the at least one heat source can be located outside of the pressure chamber. In still another aspect, at least one heat source can be a conventional heat source such as an electric furnace, gas furnace, boiler, and the like. In another aspect, the at least one heat source 400 can be at least partially enclosed by a heat shield 402.

In another aspect, and as illustrated in FIG. 9-14, the pressure chamber 200 can further comprise a process auger 230 configured to circulate hot mix 500 in the pool of hot mix and/or feedstock floating on the upper surface level 502 of the pool of hot mix 500. FIG. 15 illustrates one aspect in which the process auger can comprise a root 232 and a plurality of flights 234 extending radially outwards from the root. In another aspect, the flights can have a pressure face 236 on a downstream side of the flights and a trailing face 238 on an upstream side of the flights. In use, as will be described more fully below, as the process auger is rotated by a process auger motor 240, the pressure face of the auger flights can urge hot mix 500 and/or feedstock 320 in a desired direction.

Figure 13:
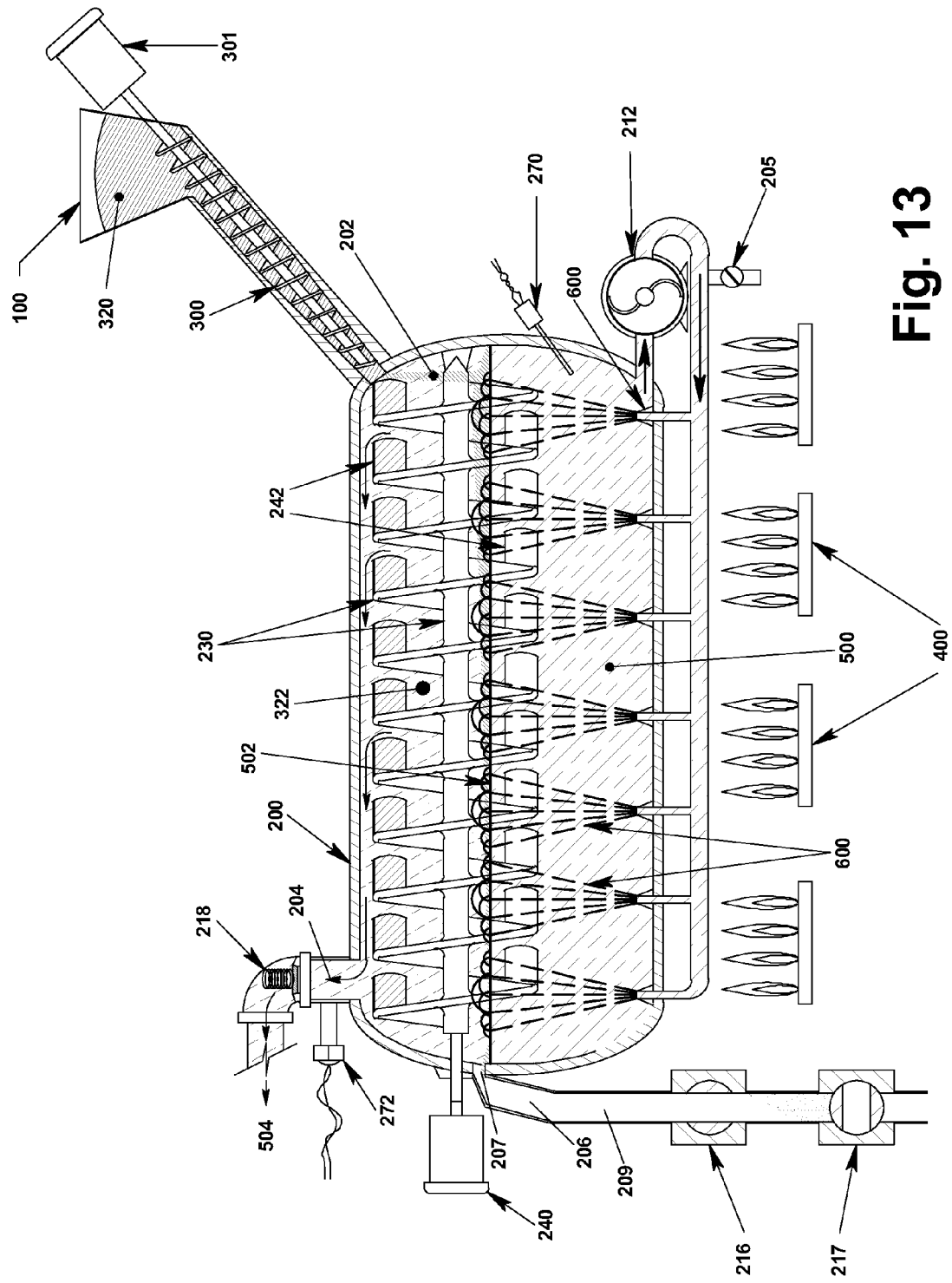
FIG. 13 is a cross-sectional side view of a system for constituent rendering of biomass and other carbon-based materials, according to one aspect.
Figure 14:
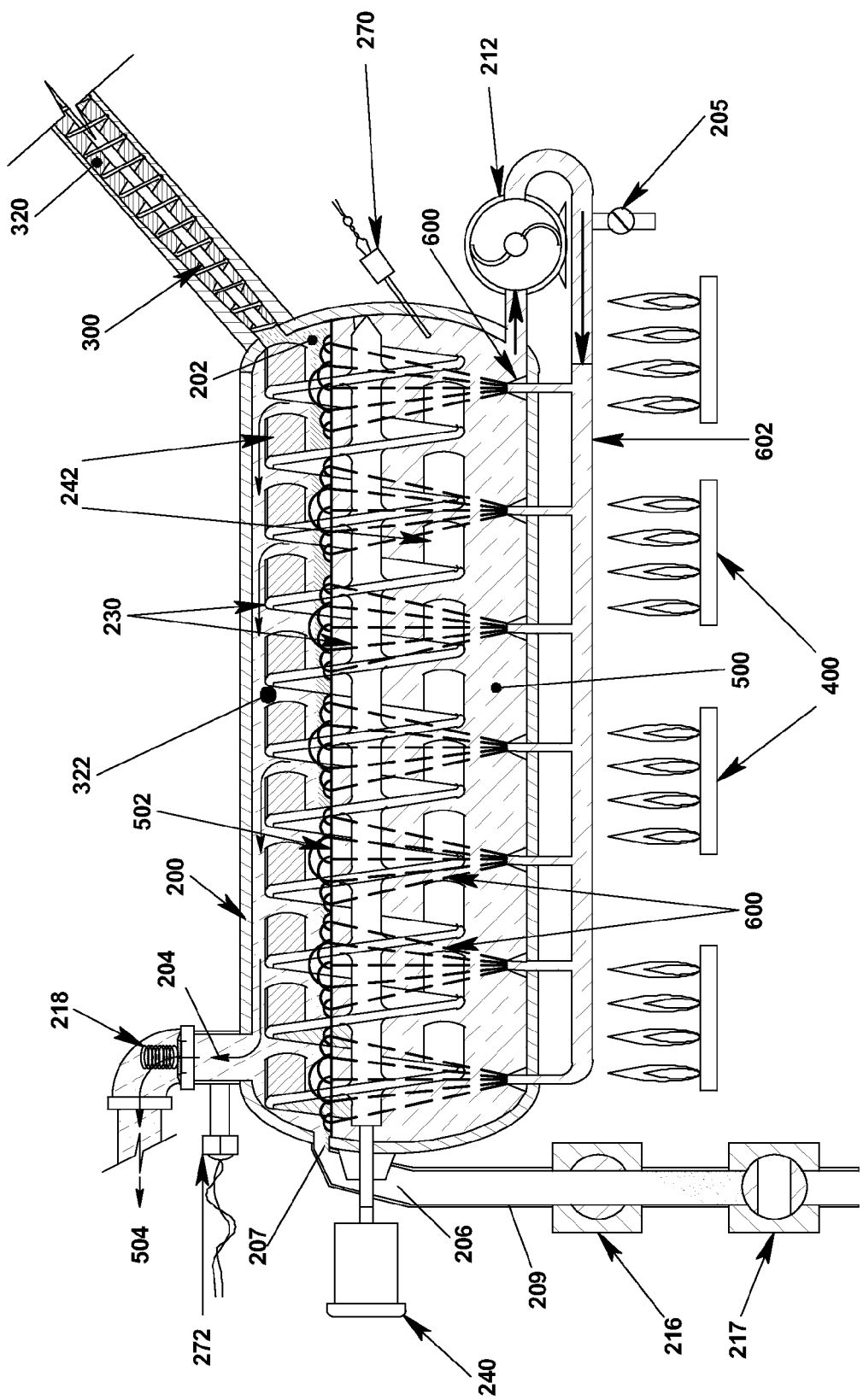
FIG. 14 is a cross-sectional side view of a system for constituent rendering of biomass and other carbon-based materials, according to one aspect.
Figure 15:
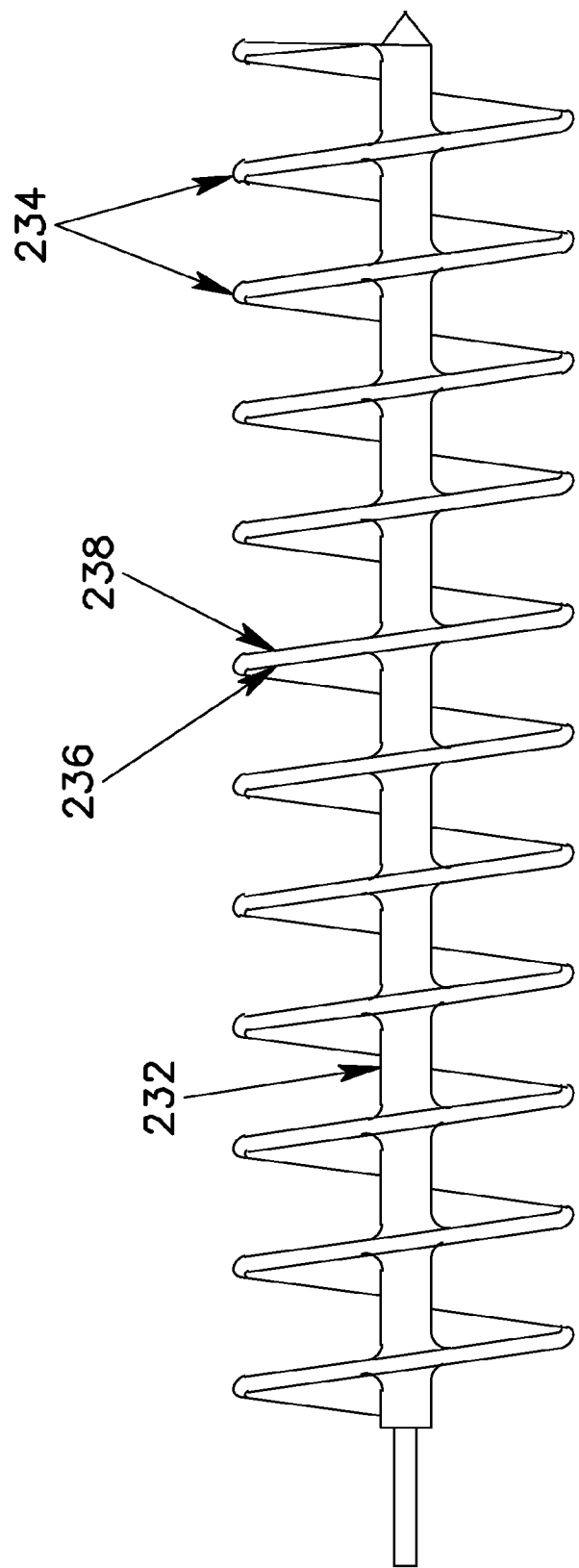
FIG. 15 is a side elevational view of a process auger of FIG. 9, according to one aspect.
Figure 16A:
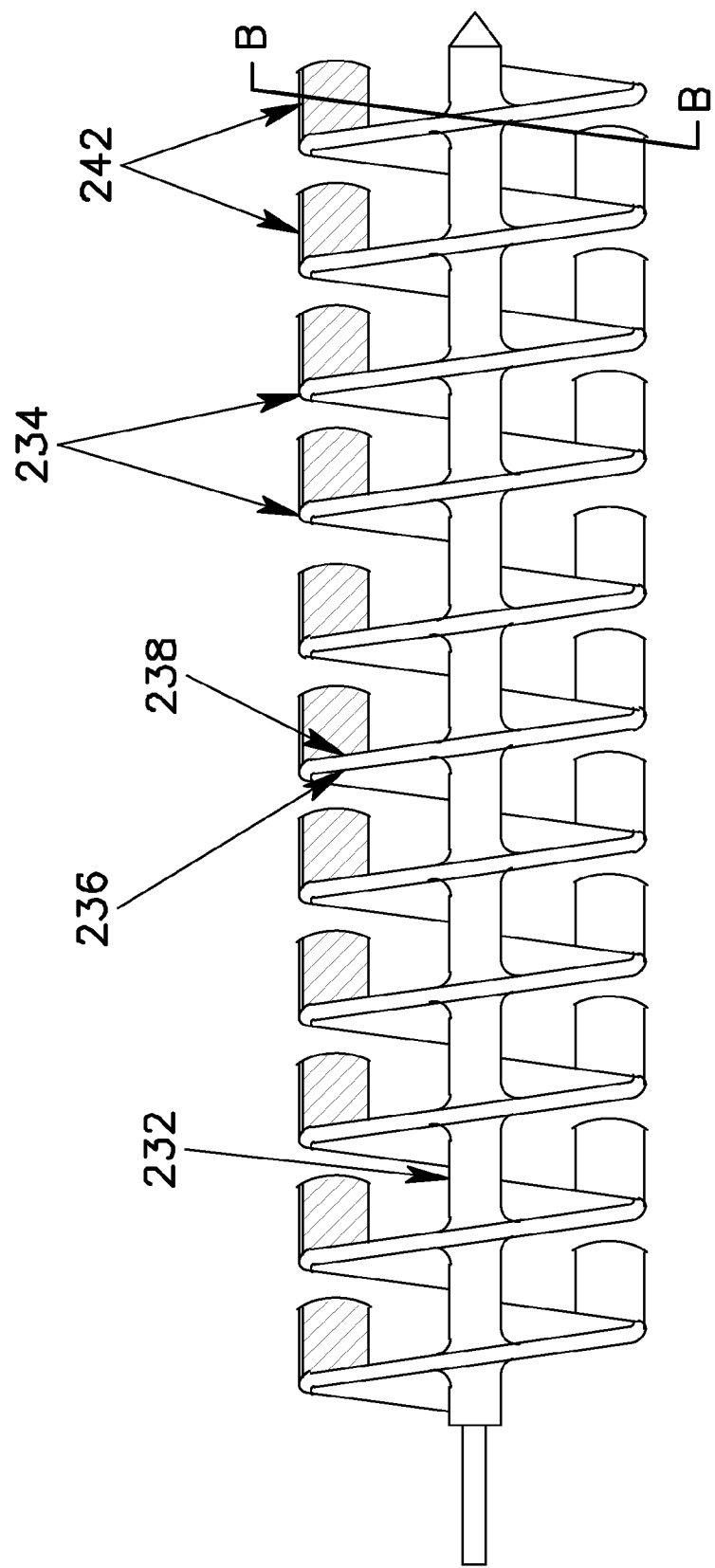
FIG. 16A is a side elevational view of a process auger of FIG. 13, according to one aspect.
Figure 16C:
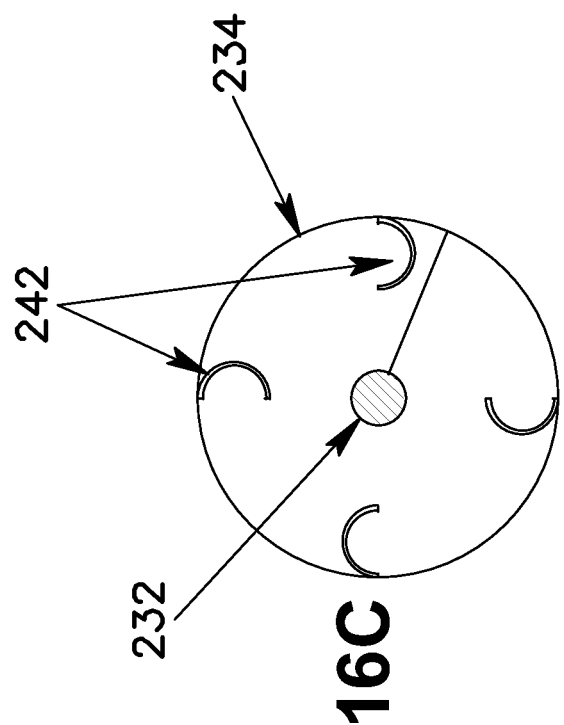
FIGS. 16B and 16C are cross-sectional end views of the process auger of FIG. 16A taken along line B-B, according to various aspects.
Figure 16B:
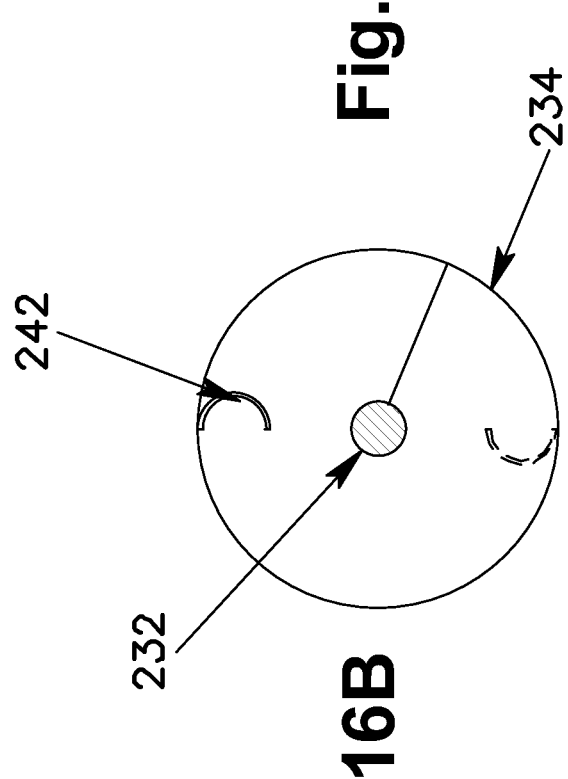

As illustrated in FIGS. 13 and 14, in still another aspect, each flight 234 of the process auger 230 can comprise at least one scoop 242 attached to the flight. In one aspect, the at least one scoop can be attached to a distal edge portion of each flight. As illustrated in FIG. 16A, according to another aspect, the at least one scoop can be attached to the trailing face 238 of each flight of the process auger. Alternatively, in another aspect, the at least one scoop 242 can be attached to the pressure face 236 of each flight 234. In yet another aspect, the at least one scoop can comprise a plurality of scoops. For example, FIG. 16B shows a cross-sectional view of a flight 234 having two scoops attached, while FIG. 16C shows a flight having four scoops 242 attached. In another aspect, the plurality of scoops can be equally spaced around the flight, though this is not required.

Figure 17B:
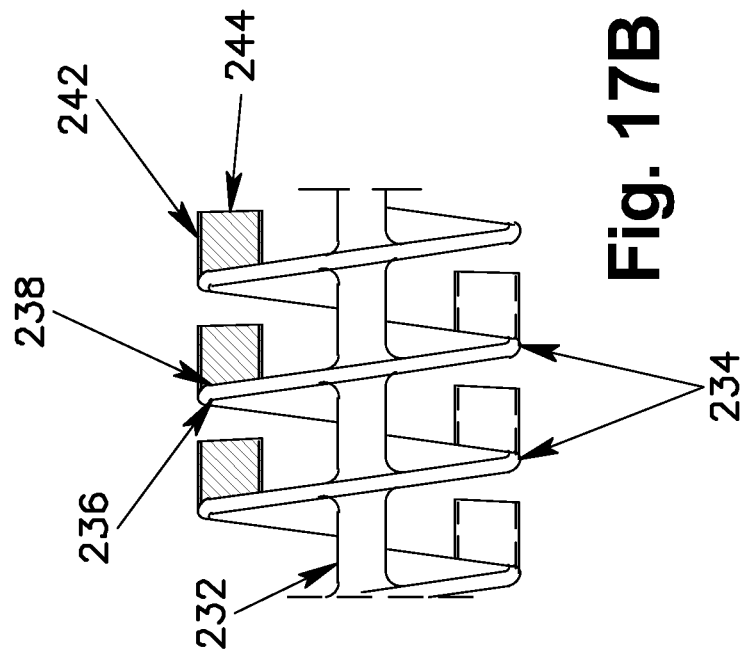
FIGS. 17A, 17B, 18A, 18B, 19A and 19B are side elevational views of a process auger showing at least one scoop, according to various aspects.
Figure 17A:
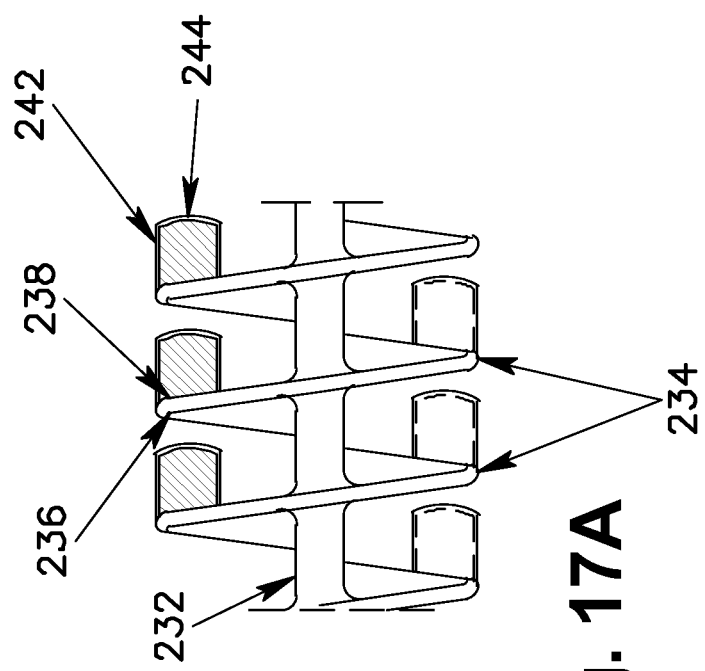

In one aspect, the at least one scoop can extend substantially parallel to a longitudinal axis of the root, as illustrated in FIGS. 17A and 17B. However, in other aspects, the at least one scoop 242 can extend from the flight at an acute angle to the longitudinal axis of the root 232, as illustrated in FIGS. 18A, 18B, 19A, and 19B.

Figure 18A:
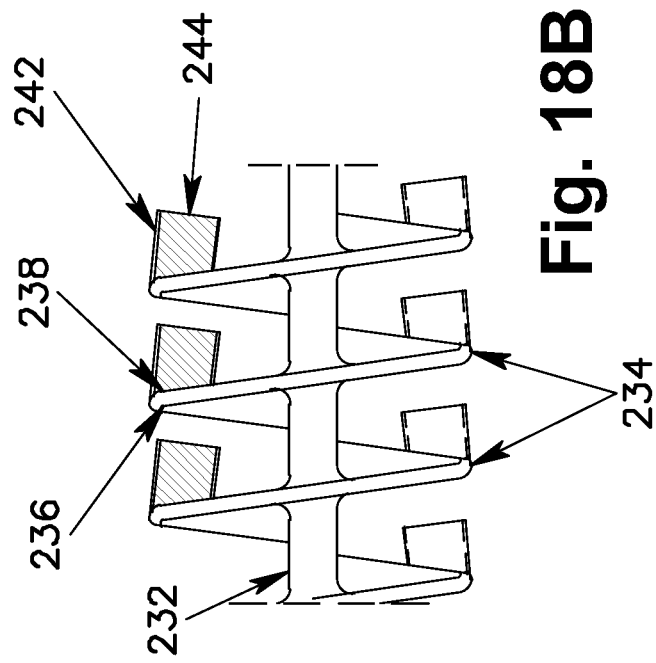
Figure 18B:
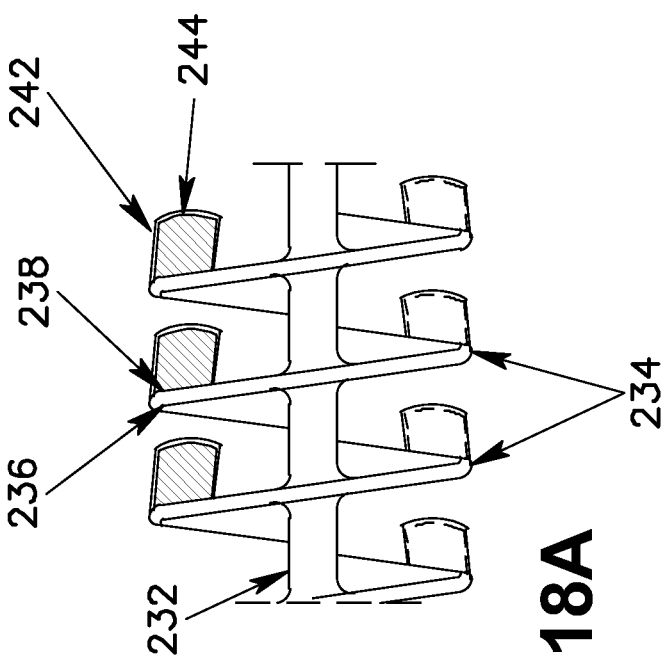
Figure 19B:
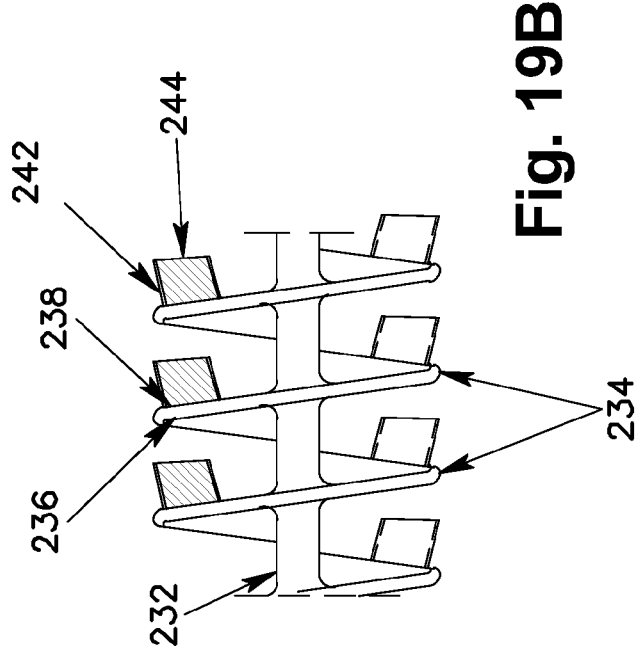
Figure 19A:
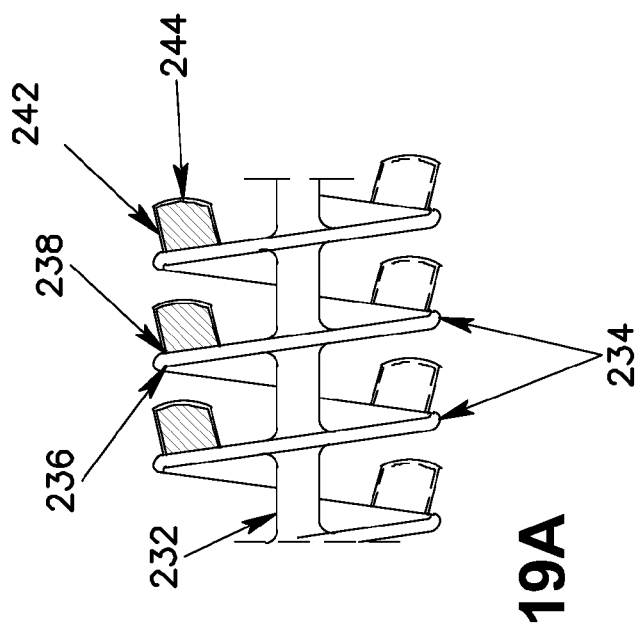

In another aspect, the at least one scoop 242 can have a substantially "C" or semi-circular cross-sectional shape, as illustrated in FIGS. 16B and 16C. In other aspects, however, the at least one scoop can have a substantially planar or arcuate cross-sectional shape. In still another aspect, an end 244 of the at least one scoop 242 opposed to the flight can be enclosed, such that the at least one scoop forms a cup shape. FIGS. 17A, 18A, and 19A illustrate the at least one scoop having an enclosed end 244, according to one aspect. Alternatively, in another aspect, the scoop end 244 can be open so that the at least one scoop forms a paddle blade shape. FIGS. 17B, 18B, and 19B illustrate the at least one scoop having an open end 244, according to one aspect.

As can be appreciated, when the process auger 230 comprises at least one scoop 242, positioning of the scoop relative to the root and the presence or absence of a closed scoop end 244 can vary the way the process auger maneuvers feedstock and/or hot mix 500 within the pressure chamber 200. For example, if the at least one scoop is positioned such that the scoop end 244 is the portion of the scoop closest radially to the root 232, as illustrated in FIGS. 18A and 18B, then any feedstock floating on the pool of hot mix can be pushed back to slow the progression of the feedstock through the pressure chamber 200. In another example, if the at least one scoop is positioned such that the scoop end is the portion of the scoop 242 farthest radially to the root 232, as illustrated in FIGS. 19A and 19B, then feedstock floating on the pool of hot mix can be pushed ahead to speed the progression of the feedstock through the pressure chamber 200.

Figure 9:
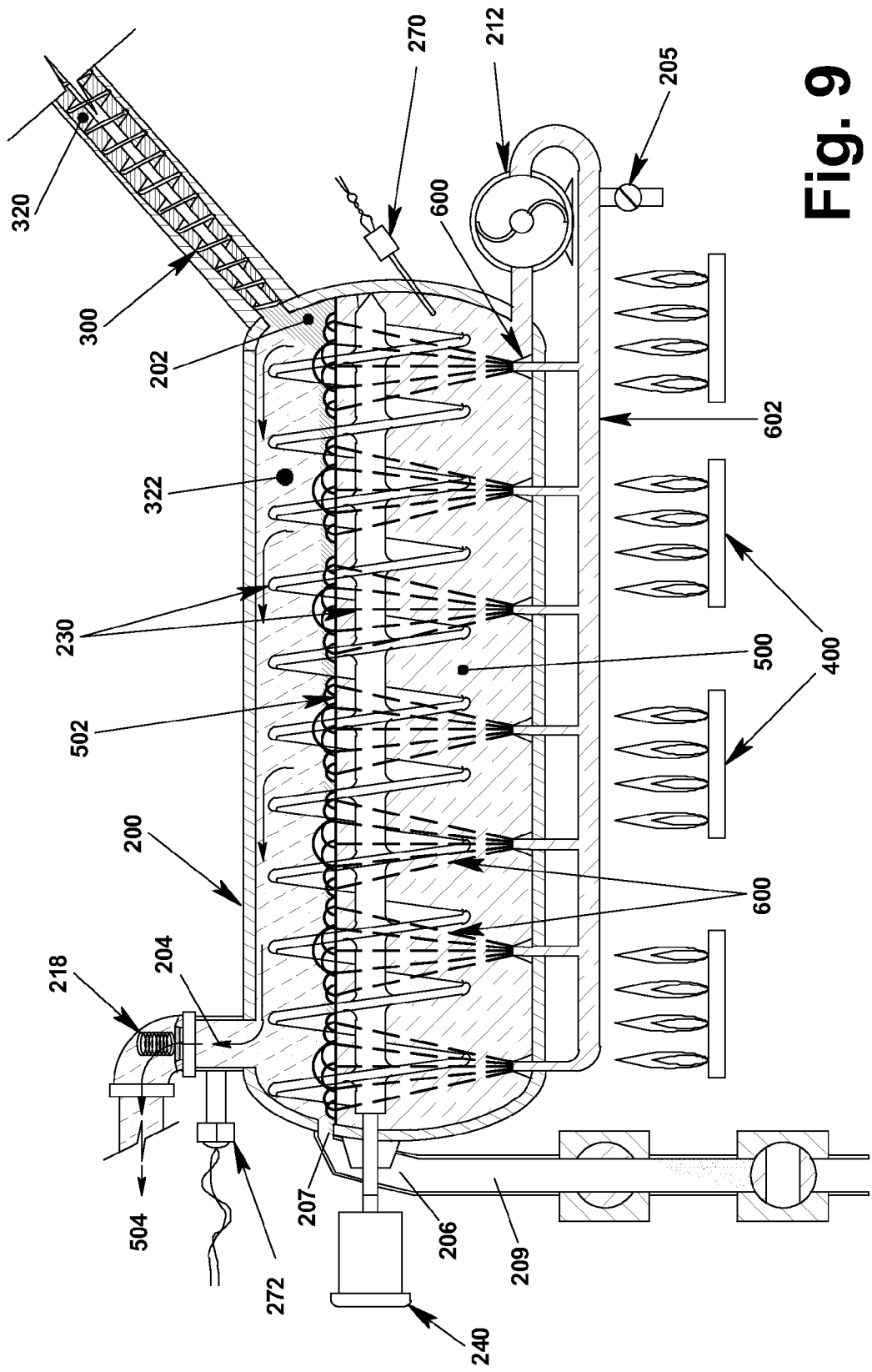
FIG. 9 is a cross-sectional side view of a system for constituent rendering of biomass and other carbon-based materials, according to one aspect.
Figure 10:
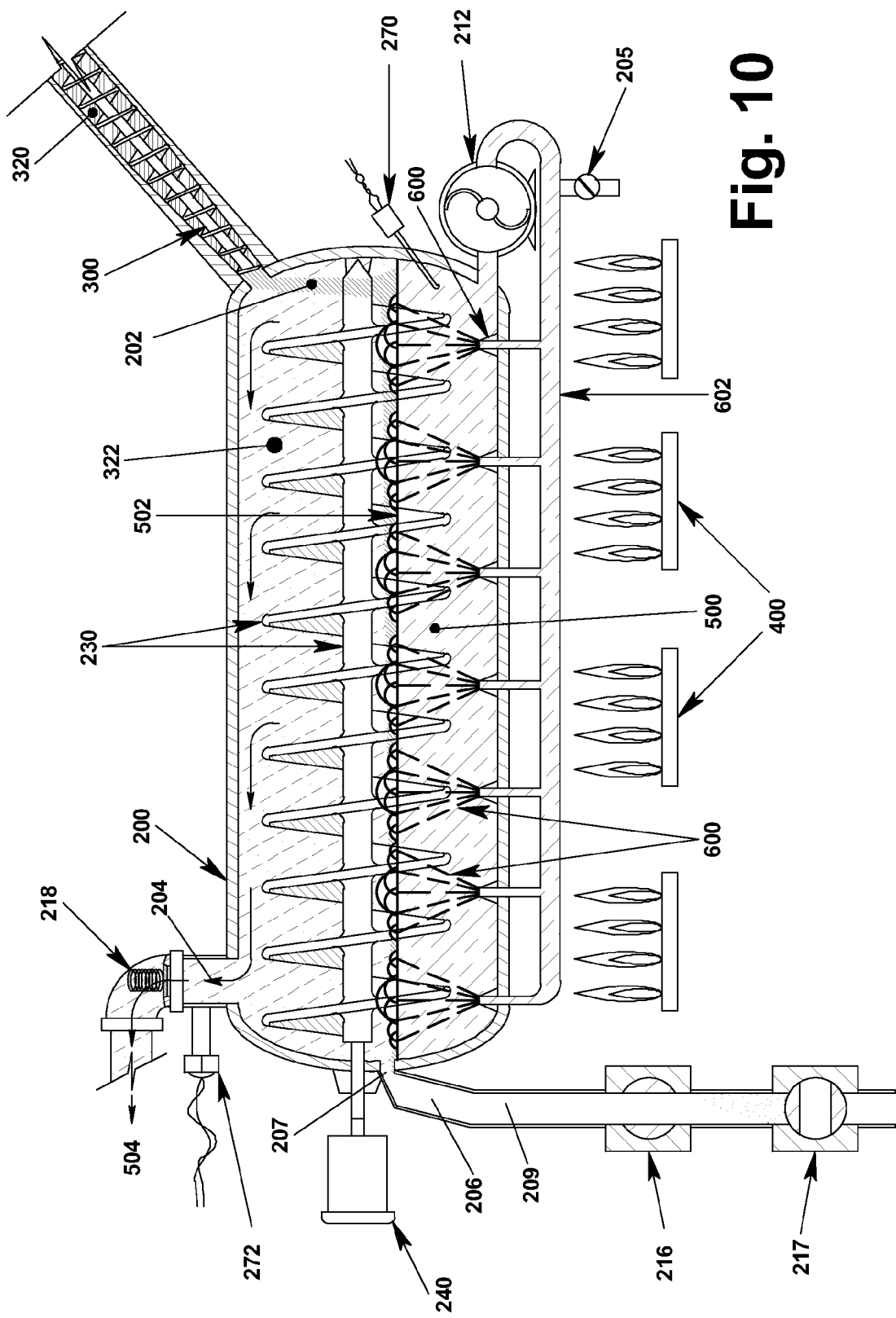
FIG. 10 is a cross-sectional side view of a system for constituent rendering of biomass and other carbon-based materials, according to one aspect.
Figure 12:
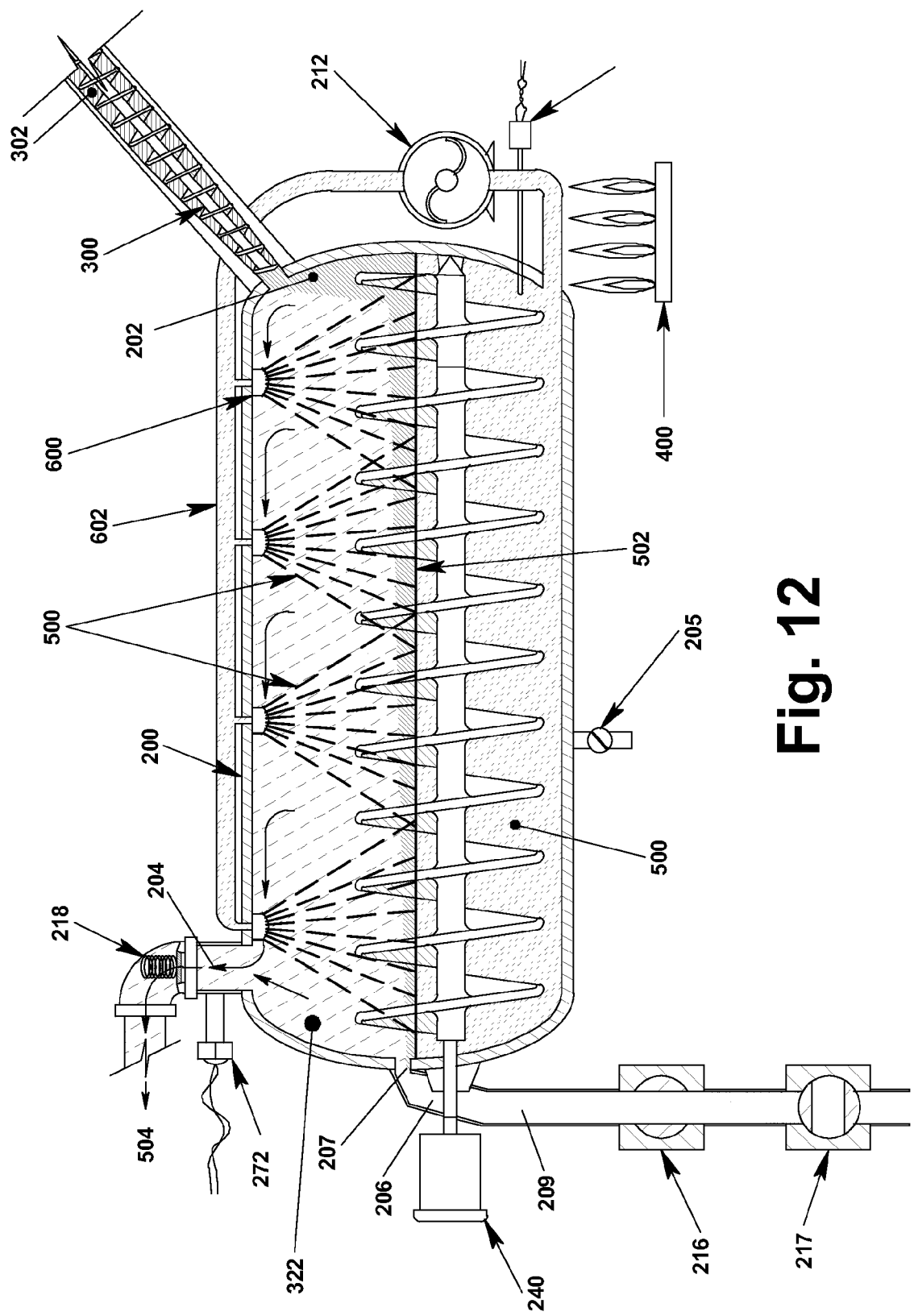
FIG. 12 is a cross-sectional side view of a system for constituent rendering of biomass and other carbon-based materials, according to one aspect.

In one aspect, the process auger 230 can be positioned in the pressure chamber 200 such that the root 232 of the process auger is substantially parallel to the upper surface level 502 of the hot mix 500. It is contemplated, however, that the process auger 230 can be positioned in the pressure chamber 200 such that the root 232 of the process auger is at an acute angle to the upper surface level of the hot mix. In another aspect, and as illustrated in FIGS. 10, 11, and 13, the process auger can be positioned in the pressure chamber such that the root is above the upper surface level of the hot mix. For example, FIG. 20A illustrates a cross-sectional end view of the process auger having a root positioned above the upper level of the hot mix. Alternatively, and as illustrated in FIGS. 9, 12, and 14, the process auger 230 can be positioned in the pressure chamber such that the root is below the upper surface level 502 of the hot mix. For example, FIG. 20B illustrates a cross-sectional end view of the process auger having a root positioned below the upper level of the hot mix. Regardless of the positioning of the root of the process auger, as the process auger rotates, each flight 234 of the plurality of flights can extend below the upper surface into the pool of hot mix 500 to aid in circulating the hot mix and/or contacting the hot mix and the feedstock 320. In another aspect, if at least one scoop 242 is present, as the process auger rotates, the scoop can at least temporarily lift a portion of the hot mix 500 and/or feedstock from the pool of hot mix to further aid circulating the hot mix and/or contacting the hot mix and the feedstock 320.

In one aspect, feedstock 320 input into the constituent rendering system 100 of the current application can be submerged and/or coated in a mixture of hot mix 500 comprising a molten heavy metal having a relatively high specific gravity. Pyrolysis of the feedstock due to the temperature of the hot mix can lead to a breakdown of the feedstock into at least one constituent component. In another aspect, because the specific gravity of the hot mix can be relatively high, the feedstock and/or the constituent components of the feedstock 320 can float to the upper surface level 502 of the pool of hot mix. Thus, any constituent components of the feedstock having a specific gravity less than the specific gravity of the hot mix will float on top of the pool of hot mix 500, and any constituent components having a specific gravity greater than the specific gravity of the hot mix will sink. In another aspect, the constituent components can then be separated and collected separately using conventional means, such as draining off any oil, filtering, removing steel components with a magnet, and skimming undesirable components such as glass, pebbles, and the like off of the upper surface of the pool of hot mix.

In one aspect, for example and without limitation, the hot mix 500 can comprise lead, which has a specific gravity of about 11.8 (the specific gravity of concrete is about 2.4 and steel is about 7.9). Thus, in this example, any constituent components of the feedstock with a specific gravity of less than 11.8 can float in the hot mix 500, and only feedstock constituent components having a specific gravity of greater than about 11.8, such as any heavy precious metals, will sink. In addition to a high specific gravity, lead is relatively chemically inert with fewer than ninety natural inorganic and organic compounds. Moreover, with a melting point of about 623° F. and a boiling point of about 3,160° F., molten lead can thermally decompose most hydrocarbon-based materials. Furthermore, a liquid can be a better heat transfer medium than a gas.

In another aspect, because oxygen contamination can cut down the production rate of the constituent components from the feedstock, a sacrificial reactant, such as, for example and without limitation, aluminum powder, can be added to the hot mix 500. In one aspect, the reactant can be more reactive to oxygen than either the feedstock 320 or the hot mix. In another aspect, the reactant can be varied to have different characteristics, depending on the feedstock. In various other aspects, at least one catalyst can also be added to the hot mix to improve production rates and/or operating efficiency. For example, it is contemplated that catalysts could be added to the hot mix 500 to enhance one or more of: liquids production, ash reduction, and/or help gas propagation control.

In various aspects, the system 100 of the present application can further comprise at least one spray head 600. In one aspect, the at least one spray head can be located proximate an upper portion of the pressure chamber such as upper surface 219. In another aspect, the at least one spray head can be directed to spray hot mix 500 downwardly onto the pool of hot mix, as illustrated, for example, in FIGS. 1 and 20B. In other aspects, the at least one spray head 600 can be located at any level in the pressure chamber that is above the upper surface level 502 of the pool of hot mix 500 in the pressure chamber. Alternatively, in one aspect, the at least one spray head can be located proximate a lower portion of the pressure chamber such as bottom surface 220. In another aspect, the at least one spray head can be directed to spray hot mix upwardly though the hot mix towards the level of the upper surface of the pool of hot mix 500 in the pressure chamber 200, as illustrated, for example, in FIGS. 9 and 20A. In other aspects, the at least one spray head can be located at any level in the pressure chamber that is below the upper surface level of the pool of hot mix 500 in the pressure chamber. Thus, the at least one spray head 600 can be submerged in the pool of hot mix. In this aspect, the submerged at least one spray head can assist in circulating the hot mix which can provide a more consistent hot mix temperature distribution. It is also contemplated that the at least one spray head 600 can comprise at least one spray head located at any level in the pressure chamber that is above the upper surface level 502 of the pool of hot mix 500 in the pressure chamber, and at least one spray head located at any level in the pressure chamber that is below the upper surface level 502 of the pool of hot mix in the pressure chamber 200.

In one aspect, the hot mix distribution system 602 can be a conduit to supply hot mix from the pressure chamber 200 through the at least one hot mix pump 210 back to the pressure container. In another aspect, the hot mix distribution system 602 can supply hot mix from the pressure chamber 200 through the at least one hot mix pump 210 and the at least one spray head 600 back to the pressure container. In still another aspect, the hot mix distribution system 602 can supply hot mix from the pressure chamber 200 through the at least one hot mix pump 210, at least one hot mix feed tube 604, and the at least one spray head 600 back to the pressure container. According to this aspect, the at least one hot mix feed tube can place the hot mix distribution system in fluid communication with the at least one spray head 600.

In another aspect, if a plurality of spray heads 600 are present, the spray heads can be spaced throughout the pressure chamber 200, and thus, a plurality of hot mix feed tubes 604 can be spaced at different locations on the hot mix distribution system 602 to supply the plurality of spray heads. In use, in one aspect, hot mix 500 can be pumped by the at least one hot mix pump 210 through the hot mix distribution system 602 to the at least one spray head. In another aspect, the at least one spray head 600 can be configured to spray hot mix down onto the pool of hot mix and/or any feedstock 320 located below the level of the at least one spray head, or upwards through the pool of hot mix towards the upper surface level 502 of the pool of hot mix.

The feedstock for the system 100 can be any biomass and/or other carbon-based materials. In one aspect, the feedstock can comprise wood or logging waste, such as wood chips and the like. In other aspects, the feedstock can comprise paper, plastic, tires, garbage, or sewage sludge. In various other aspects, the feedstock 320 can comprise oil sands, oil shale, dirty coal and/or other similar contaminated sources of hydrocarbons. In still other aspects, the feedstock can comprise any combination of different biomass and/or other carbon-based materials.

In use, in various aspects, the pressure chamber 200 can be evacuated of oxygen through the use of a sacrificial compound such as aluminum and the like, as known in the art, or replaced with an inert gas such as nitrogen, carbon dioxide, helium, argon or some such non-reactive gas, also as known in the art. In one aspect, evacuating oxygen from the system 100 can be necessary to keep the hot mix 500 from oxidizing along with the feedstock 320. In another aspect, the pressure chamber can be pressurized by the gases 322 generated during the pyrolysis process, and this pressure can be regulated by a conventional pressure relief valve 218. For example, one cubic inch of feedstock can gasify to over 1,000 cubic inches of gases such that, when restricted by the pressure relief valve, pressure within the pressure chamber can build until the pressure is sufficient to overcome the pressure relief valve. In still another aspect, the at least one heat source 400 can heat the hot mix to a predetermined temperature.

The feedstock hopper 302 can feed the feedstock auger screw 304 with coarse raw feedstock, and the feedstock auger screw 304 can move the material to each grinding station 306, where the feedstock 320 can be ground into smaller pieces until its desired consistency is achieved. The ground feedstock 320 can then enter the compression zone 310, and the plurality of blocking plates 318 can be inserted in the compression gate 308. The feedstock auger screw 304 can continue turning with the compression gate 308 blocked by the plurality of blocking plates until a feedstock plug is formed having the desired density of solidly packed feedstock. The blocking plates 318 can then be removed from the compression gate 308 and replaced with the throat 330. The fracture stress points 332 of the throat 330 can cause a back pressure to add to the compressing of the feedstock 320. At the same time, as the feedstock plug is passed through the throat 330, the fracture stress points can fracture the plug, causing it to rapidly expand back into an uncompressed state as it enters the expansion zone 312. To facilitate this, the volume of the expansion zone 312 can be increased to make room for the expanded feedstock. Following the expansion zone 312, the feedstock 320 can enter the re-grinding station 314 to reduce the feedstock particle size back to a desired size.

The re-ground feedstock can then be gravity fed, conveyed, and/or otherwise urged to the feedstock input port 202 of the pressure chamber 200. After passing through the feedstock input port, the feedstock can drop into the interior volume of the pressure chamber and come to rest on the pool of hot mix 500. Additionally, if at least one spray head 600 is present proximate the upper portion of the pressure chamber, the feedstock 320 in the pressure chamber 200 can also have hot mix spraying down on it from the at least one spray head. Because oxygen has either been removed or its level lowered to acceptable levels within the pressure chamber, at least a portion of the hydrocarbons present in the feedstock will not oxidize when heated, and instead will be decomposed through pyrolysis into at least one constituent component. Thus, upon contacting the hot mix, the feedstock 320 can begin to be broken into its constituent components. In another aspect, any feedstock that gasifies at this point can be free to exit the pressure chamber through the at least one gas output port 204 for collection and further processing. The volume of gas and its velocity can be such that the gas cannot carry either feedstock or hot mix out any gas output port. In another aspect, any constituent components that have gasified and remain in the pressure chamber 200 can exit the system as a gas, as described above. In one aspect, gases 504 exiting the system 100 can be burned or liquefied through compression. In still another aspect, any constituent components remaining as liquids can be distilled out.

Any feedstock that has not been processed, any constituent components that are not gases, and any ash created can be carried by the current of hot mix created by at least one hot mix pump and/or the process auger 250 through the interior volume of the pressure chamber 200. As previously discussed, any ash that is formed can be collected in the ash trap 206, and any other constituent components remaining as solids can be collected in the ash trap or removed from the pressure chamber by filtering, magnetically removing, and/or skimming them off.

Figure 21:
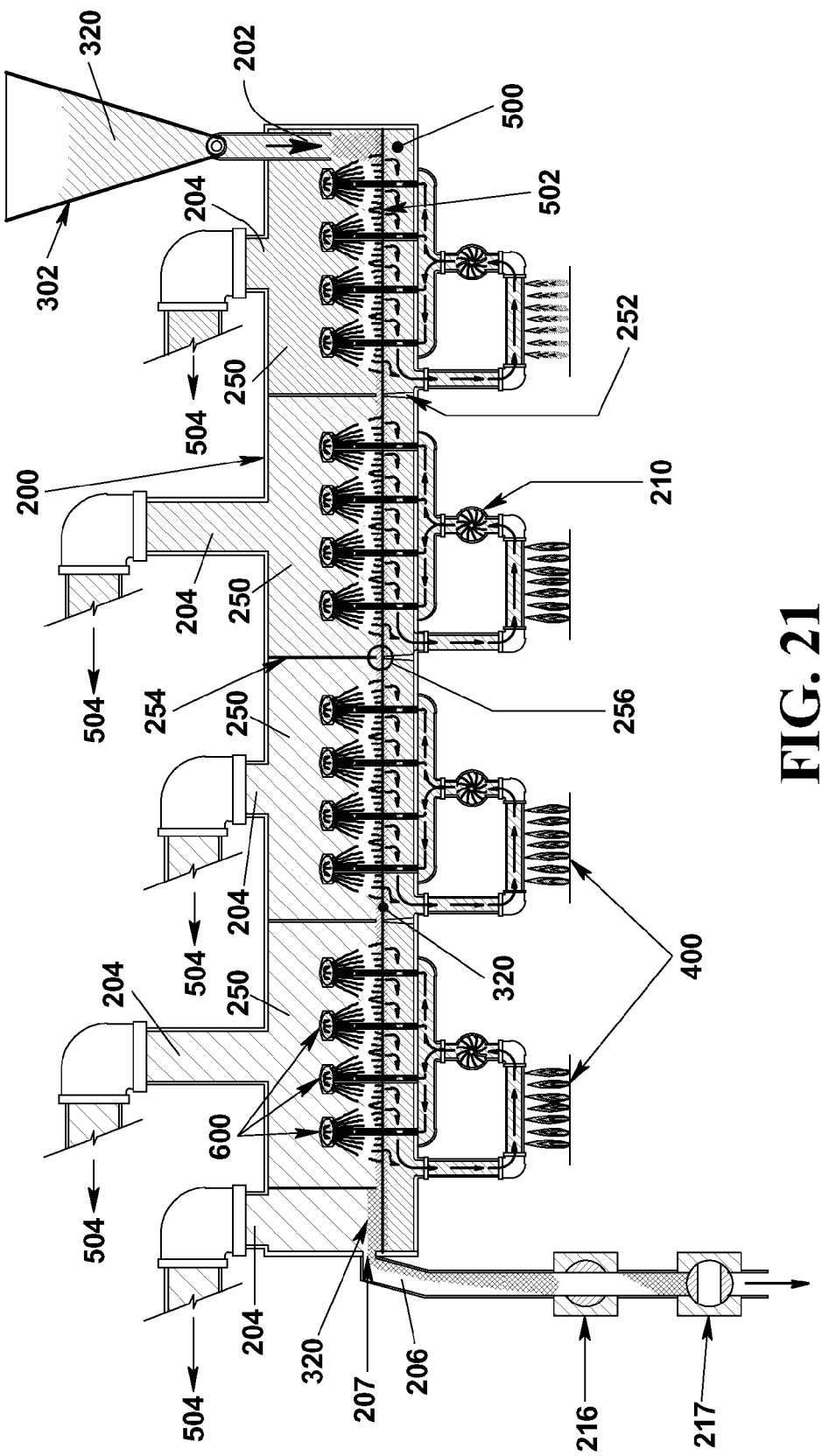
FIG. 21 is a cross-sectional side view of a system for constituent rendering of biomass and other carbon-based materials, according to one aspect.

In another embodiment, and as illustrated in FIG. 21, the pressure chamber 200 can be separated into a plurality of processing zones 250. In one aspect, each zone of the plurality of processing zones can comprise at least one heat source 400 and/or at least one hot mix pump 210, and can define at least one gas output port 204. Thus, in another aspect, each zone of the plurality of processing zones 250 can operate at a temperature independent of the other processing zones. In other aspects, each processing zone can also define various other ports configured for skimming off or otherwise removing any constituent components, as desired, from a selected processing zone. In another aspect, each processing zone 250 can further comprise at least one temperature sensor 270 and/or at least one pressure sensor 272. In this aspect, the at least one pressure sensor can send a signal representing the pressure within each processing zone to a means for controlling the pressure within the processing zone, such as a processor, an actuator and a valve and the like. Similarly, the at least one temperature sensor 270 can send a signal representing the temperature within the processing zone 250 to a means for controlling the temperature, such as a processor and a heat source and the like.

In one aspect, at least a portion of each processing zone 250 can be defined by at least one gas barrier 254 and at least one hot mix barrier 252. In another aspect, the at least one gas barrier can extend substantially vertically from the upper surface 219 of the pressure chamber 200 so that a distal end of the at least one gas barrier can be at a level above or slightly above the level of the upper surface level 502 of the pool of hot mix 500, leaving a space for ungasified feedstock 320 to pass through. In another aspect, the at least one hot mix barrier 252 can extend substantially vertically from the bottom surface 220 of the pressure chamber so that a distal end of the at least one gas barrier can be at a level slightly below or equal to the upper surface level of the pool of hot mix. In yet another aspect, the at least one gas barrier 254 can be substantially co-planar with a corresponding hot mix barrier. In another aspect, the distal end of each gas barrier 254 and the distal end of each corresponding hot mix barrier 252 can be separated a predetermined distance, forming at least one pass-through gate 256, to allow any ungasified feedstock 320 being processed to pass from one processing zone to an adjacent processing zone. In still another aspect, the pass-through gate can prevent at least a portion of the gases and/or the hot mix within a processing zone 250 from being passed between adjacent zones. In another aspect, the processing zones can be substantially thermally separated but, because the processing zones are in communication through at least one pass-through gate 256, the processing zones can share a common pressure. In another aspect, the size of the at least one pass-through gate (the predetermined distance between the distal end of each gas barrier 254 and the distal end of each corresponding hot mix barrier 252) can be selected from the range of about 0.1 inches to about 12 inches, such as 0.2 inches, 0.3 inches, 0.4 inches, 0.5 inches, 0.6 inches, 0.7 inches, 0.8 inches, 0.9 inches, 1.0 inches, 2 inches, 3 inches, 4 inches, 5 inches, 6 inches, 7 inches, 8 inches, 9 inches, 10 inches, 11 inches, or 12 inches, though other distances are also contemplated.

Figure 22:
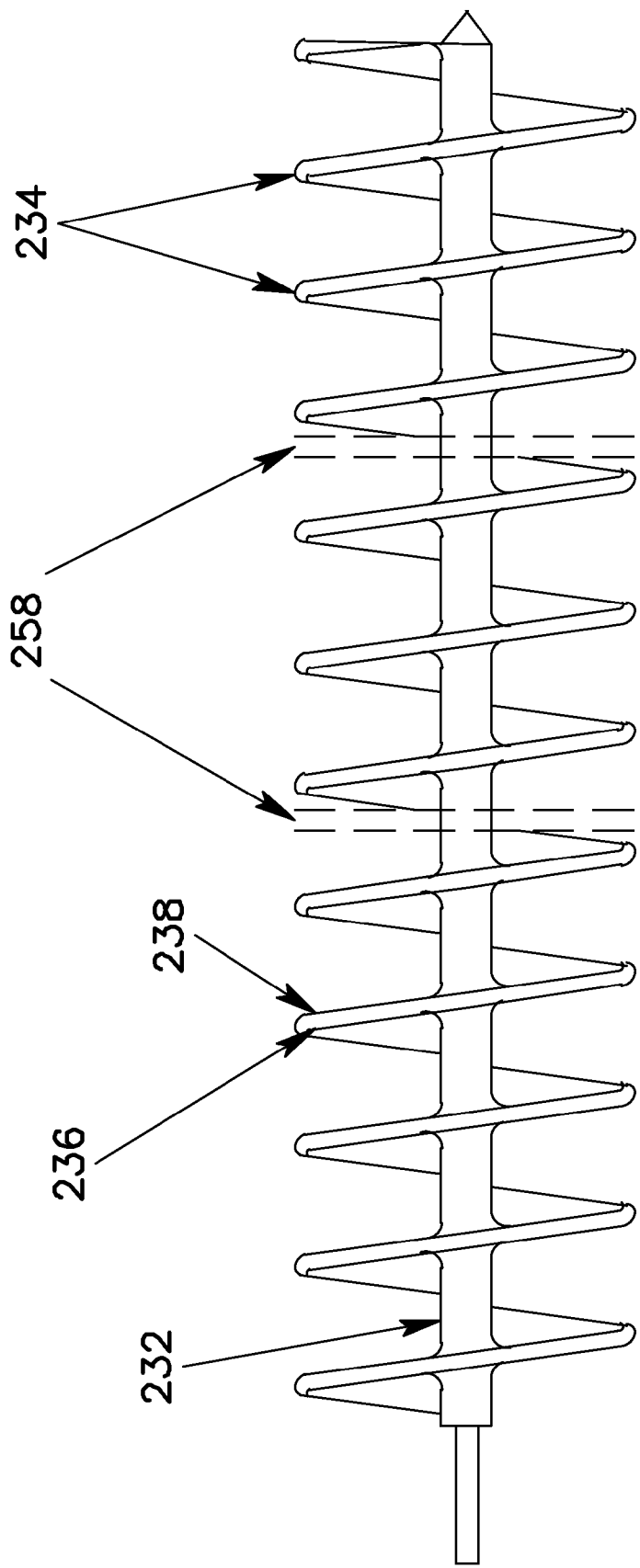
FIG. 22 is a side elevational view of a process auger, according to one aspect.

If a process auger 230 is present in a pressure chamber 200 separated into a plurality of processing zones 250, in one aspect, zone barrier clearance channels 258 can be defined in portions of the process auger, as illustrated in FIG. 22. In this aspect, the zone barrier clearance channels can provide clearance so that the flights 234 of the process auger do not contact portions of the gas barrier 254 and/or the hot mix barrier 252

In another aspect, it is contemplated that the at least one hot mix pump 210 positioned within each processing zone 250 can circulate hot mix 500 within each processing zone to create a current to move the feedstock 320 from one processing zone to an adjacent processing zone. It is contemplated that some cross-mixing of feedstock and/or gases can likely occur. It is further contemplated that the first processing zone (the processing zone in which the feedstock input port 202 is located) can be maintained at the lowest desired temperature and that each successive processing zone can have a progressively higher temperature, until the final processing zone, which can have the highest desired temperature. In one aspect, this can allow the capture of the most volume of the most desirable hydrocarbons and/or other constituent components while encouraging as much of the feedstock as reasonable to be processed.

In use, in this embodiment, as discussed above, the pressure chamber 200 can be evacuated of oxygen and the at least one heat source 400 of each zone can heat the hot mix 500 of each processing zone 250 to a predetermined temperature. The at least one hot mix pump 210 of each processing zone can circulate hot mix through the respective zone and through the at least one spray head 600 of the zone, if present. The feedstock input system 300 can operate as previously described to supply ground feedstock 320 to the feedstock input port 202 of the pressure chamber. After passing through the feedstock input port, the feedstock can drop into a first processing zone to begin to be broken into at least one constituent component. In one aspect, any feedstock that gasifies in the first processing zone can exit the zone via the at least one gas output port 204 located in that zone, and any constituent components that are not gases can exit the zone via the various other processing zone ports, if desired. Any feedstock that is not processed, any constituent components that are not gases remaining in the processing zone, and any ash created can be carried by the current of hot mix created by at least one hot mix pump and/or the process auger 230 through the pass-through gate 256 to an adjacent processing zone. This process can be repeated in each zone of the plurality of processing zones 250. In the final processing zone, any ash that has been formed can be collected in the ash trap 206, and any other constituent components remaining as solids or liquids can be removed from the pressure chamber by filtering, magnetically removing, skimming, draining them off, and/or by other removal methods.

In one aspect, the constituent rendering system 100 can be configured to be a mobile system capable being transported on trucks, barges, and the like. Thus, in this aspect, the system can be set up in locations that have an available supply of feedstock 320, such as, for example, a forest logging site, thereby reducing the costs of transporting feedstock to the system. In another aspect, the system 100 can be configured to be transported as one piece. In another aspect, however, the system can be configured to be broken into components that can be transported on trucks, barges, and the like and assembled at a desired location.

Figure 23:
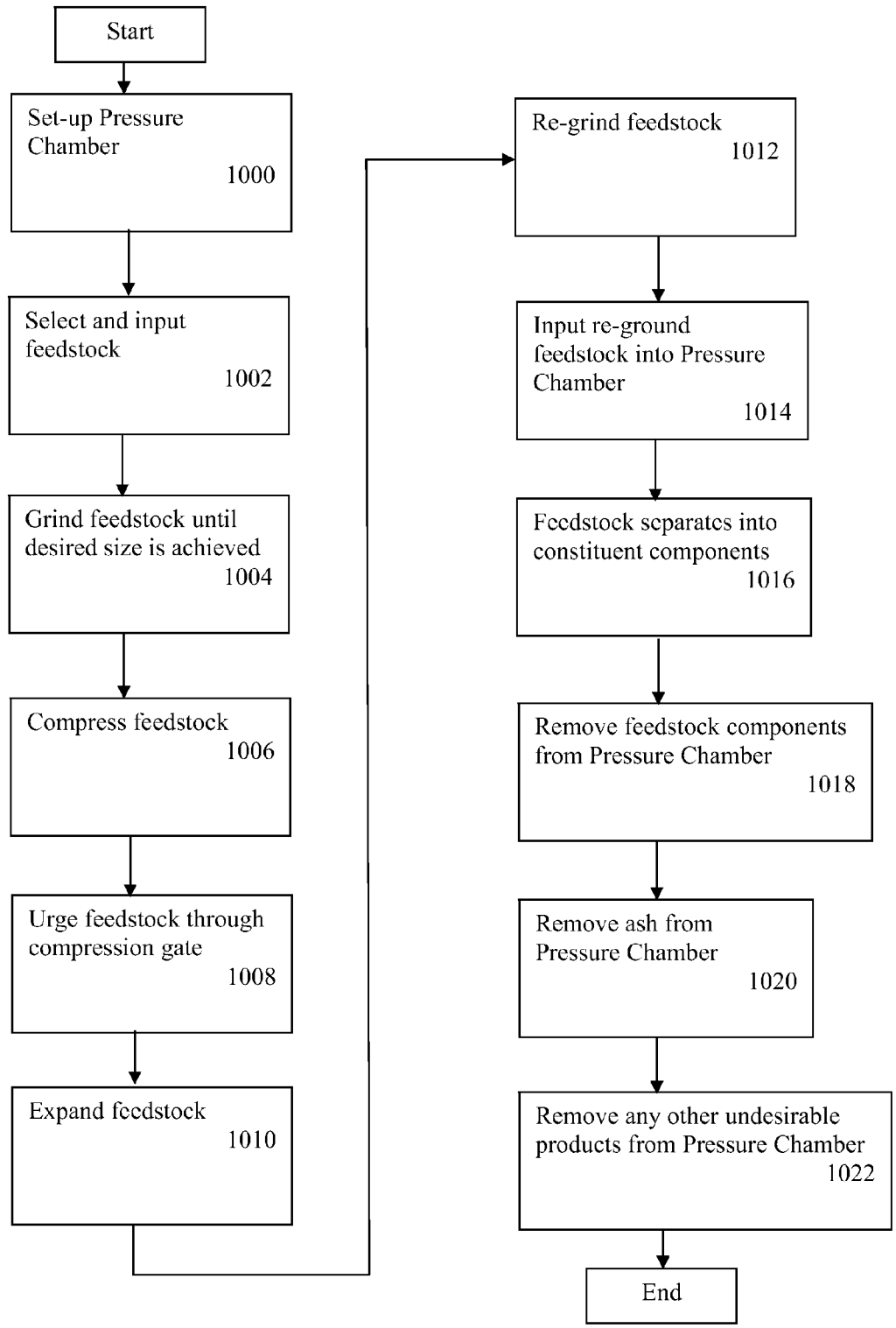
FIG. 23 illustrates an exemplary flow chart showing the steps to render constituents of biomass and other carbon-based materials

One embodiment of a method for constituent rendering of biomass and other carbon-based materials is shown, for example, in FIG. 23. The method can begin, in one aspect, at step 1000 with setting the pressure chamber to the desired temperature, pressure and oxygen levels. Additionally at step 1000, catalysts and reactants can optionally be added to the hot mix as desired to improve production rates and/or efficiencies. At step 1002, feedstock can be selected and added to the feedstock input system. At step 1004, the coarse raw feedstock can be ground at the at least one grinding station. As discussed above, the at least one grinding station can comprise a plurality of grinding stations. Thus, in one aspect, the step of grinding the feedstock can be repeated at each grinding station of the plurality of grinding stations until a desired feedstock consistency is achieved. At step 1006, the ground feedstock can then enter the compression zone, and the plurality of blocking plates can be inserted in the compression gate to create a plug of solidly packed feedstock. At step 1008, the blocking plates can be removed from the compression gate and replaced with the throat, and the plug of feedstock can be urged through the throat. At step 1010, the feedstock can be expanded in the expansion zone, and at step 1012, the feedstock can enter the re-grinding station to reduce the feedstock particle size back to a desired size.

At step 1014, the re-ground feedstock can then be gravity fed, conveyed, and/or otherwise urged to the feedstock input port of the pressure chamber where the feedstock can be placed into contact with the hot mix through contact with the pool of hot mix and/or hot mix sprayed from at least one spray head. At step 1016, at least a portion of the hydrocarbons present in the feedstock begin to undergo pyrolysis and separate into at least one constituent component. At step 1018, any feedstock that gasifies can be exit the pressure chamber through at least one gas output port, and any feedstock components that are solids or liquids can be removed at this point by filtering, magnetically removing, skimming, and/or draining them off. If a plurality of processing zones are present, the step of removing desired feedstock constituent components can be repeated at each processing zone. At step 1020, any ash created can be collected in the ash trap, and at step 1022, any other undesirable products can be removed from the pressure chamber. This method can be repeated continuously, i.e., as the feedstock input system empties and constituent components are removed from the pressure chamber, the method can begin again at step 1000.

It will be apparent to those skilled in the art that various modifications and variations can be made in the present invention without departing from the scope or spirit of the invention. Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A system for a constituent rendering of carbon-based feedstock comprising:
   a pressure chamber defining an enclosed interior volume, a feedstock input port and at least one gas output port;
   a feedstock input system in communication with the feedstock input port, wherein the feedstock input system comprises:
   an auger feed tube;
   at least one feed stock auger screw, wherein the at least one feedstock auger screw is located within the auger feed tube;
   at least one grinding station contained within the auger feed tube, wherein the at least one grinding station comprises a die attached to the at least one feed stock auger screw, wherein the grinding station is configured to grind the carbon-based feedstock into smaller carbon-based feedstock pieces by the at least one auger feed screw forcing the carbon-based feedstock through the die prior to the carbon-based feedstock being input into the pressure chamber, and
   a selectively movable compression gate associated with the auger feed tube and the at least one feedstock auger screw, wherein the compression gate is positioned between the at least one grinding station and the feedstock input port, wherein the at least one feedstock auger screw is configured to rotate and urge the carbon-based feedstock through the auger feed tube of the feedstock input system, through the at least one grinding station, and through the feedstock input port of the pressure chamber, wherein the compression gate is selectively movable between an open position and a closed position, wherein in the closed position, the carbon-based feedstock is prevented from passing through the compression gate and wherein in the open position, the carbon-based feedstock is urged through the compression gate by the at least one feedstock auger screw to the input port; and a liquid hot mix heat transfer medium positioned within the interior volume of the pressure chamber forming a pool of hot mix transfer medium having an upper surface level, wherein carbon-based feedstock input into the pressure chamber through the feedstock input port is broken into at least one constituent component by the hot mix transfer medium, and wherein at least a gas constituent component can exit the pressure chamber through the at least one gas output port.

2. The system of claim 1, wherein the feedstock input system further comprises a compression zone within the auger feed tube, wherein the compression zone is defined by the compression gate and the auger feed tube and is positioned between the compression gate and the at least one grinding station, wherein when the compression gate is in the closed position, the carbon-based feedstock is compressed against the compression gate in the compression zone by the at least one feedstock auger screw to form a carbon-based feedstock plug.

3. The system of claim 2, wherein the feedstock plug is substantially gas impervious and will not allow passage of atmospheric gas through the feedstock input port.

4. The system of claim 3, wherein the feedstock input system further comprises a means for fracturing the carbon-based feedstock plug as it is urged through the compression gate.

5. The system of claim 4, wherein the means for fracturing comprises a plurality of compression and fracture stress points positioned in the compression gate.

6. The system of claim 2, wherein the feedstock plug is substantially gas impervious and will not allow passage of gas from the pressure chamber through the feedstock input port to the atmosphere.

7. A system for a constituent rendering of carbon-based feedstock comprising:

a pressure chamber defining an enclosed interior volume, a feedstock input port and at least one gas output port;

a liquid hot mix heat transfer medium comprising lead positioned within the interior volume of the pressure chamber forming a pool of hot mix transfer medium having an upper surface level;

a feedstock input system in communication with the feedstock input port, wherein the feedstock input system comprises:

an auger feed tube;

at least one feedstock auger screw positioned within the auger feed tube, wherein the at least one feedstock auger screw is configured to rotate and urge the carbon-based feedstock through the auger feed tube of the feedstock input system and through the feedstock input port of the pressure chamber;

at least one grinding station contained within the auger feed tube, wherein the at least one grinding station comprises a die attached to the at least one feed stock auger screw, wherein the grinding station is configured to grind the carbon-based feedstock into smaller carbon-based feedstock pieces by the at least one auger feed screw forcing the carbon-based feedstock through the die prior to the carbon-based feedstock being input into the pressure chamber;

a compression gate associated with the auger feed tube and positioned between the at least one grinding station and the feedstock input port, wherein the compression gate is selectively movable between an open position and a closed position, wherein in the closed position, the carbon-based feedstock is restricted from passing through the compression gate and wherein in the open position, the carbon-based feedstock is urged through the compression gate by the at least one feedstock auger screw; and a compression zone, wherein the compression zone is defined by the compression gate and the auger feed tube and is positioned between the compression gate and the at least one grinding station, wherein when the compression gate is in the closed position, the carbon-based feedstock is compressed against the compression gate in the compression zone by the at least one feedstock auger screw to form a carbon-based feedstock plug;

at least one spray head positioned in the pressure chamber proximate a lower portion of the pressure chamber and configured to spray liquid hot mix heat transfer medium upwardly through the liquid hot mix heat transfer medium towards the upper surface level of the pool of liquid hot mix heat transfer medium; and a process auger rotatably positioned in the pressure chamber and configured to circulate the liquid hot mix heat transfer medium, wherein the process auger comprises a root, a plurality of flights extending radially outwards from the root, and at least one scoop attached to at least one flight of the plurality of flights, wherein the root is positioned substantially parallel to the upper surface level of the pool of liquid hot mix heat transfer medium, wherein the root is positioned above the upper surface level of the pool of liquid hot mix heat transfer medium, wherein the at least one scoop extends substantially parallel to a longitudinal axis of the root, and wherein the at least one scoop is substantially semi-circular in cross-sectional shape, wherein carbon-based feedstock input into the pressure chamber through the feedstock input port is broken into at least one constituent component by pyrolysis, and wherein a gas constituent component can exit the pressure chamber through the at least one gas output port.

* * * * *